(12) United States Patent
Prem

(10) Patent No.: US 7,748,264 B2
(45) Date of Patent: Jul. 6, 2010

(54) MEASUREMENT OF PAVEMENT UNEVENNESS

(75) Inventor: Hans Prem, Templestowe (AU)

(73) Assignee: Mechanical System Dynamics Pty Ltd, Templestowe (AU)

( * ) Notice: Subject to any disclaimer, the term of this patent is extended or adjusted under 35 U.S.C. 154(b) by 262 days.

(21) Appl. No.: 12/089,049

(22) PCT Filed: Oct. 5, 2006

(86) PCT No.: PCT/IB2006/002783

§ 371 (c)(1),
(2), (4) Date: Apr. 2, 2008

(87) PCT Pub. No.: WO2007/039815

PCT Pub. Date: Apr. 12, 2007

(65) Prior Publication Data

US 2008/0219764 A1    Sep. 11, 2008

(30) Foreign Application Priority Data

Oct. 5, 2005    (AU) .............................. 2005905487

(51) Int. Cl.
*G01M 17/02* (2006.01)
(52) U.S. Cl. ....................................... 73/146

(58) Field of Classification Search ....................... None
See application file for complete search history.

(56) References Cited

U.S. PATENT DOCUMENTS

| | | | | | |
|---|---|---|---|---|---|
| 4,422,322 | A | * | 12/1983 | Spangler | 73/105 |
| 4,502,327 | A | * | 3/1985 | Scrivener et al. | 73/146 |
| 4,653,316 | A | * | 3/1987 | Fukuhara | 73/146 |
| 4,741,207 | A | * | 5/1988 | Spangler | 73/146 |
| 4,887,463 | A | * | 12/1989 | Wood | 73/146 |
| 4,896,964 | A | * | 1/1990 | Kitazume | 356/602 |
| 4,899,296 | A | * | 2/1990 | Khattak | 702/40 |
| 5,393,167 | A | * | 2/1995 | Fujita et al. | 404/84.1 |
| 5,614,670 | A | * | 3/1997 | Nazarian et al. | 73/146 |
| 6,615,648 | B1 | * | 9/2003 | Ferguson et al. | 73/146 |
| 7,546,765 | B1 | * | 6/2009 | Janke et al. | 73/146 |
| 2002/0059824 | A1 | * | 5/2002 | Ono et al. | 73/146 |

* cited by examiner

*Primary Examiner*—Andre J Allen
(74) *Attorney, Agent, or Firm*—Hogan Lovells US LLP

(57) ABSTRACT

Measuring the unevenness of a pavement surface. A frame carrying an array of sensors is transported above the pavement surface. At a first position, the distance of each sensor is measured from respective first points on the pavement surface. The measurements are repeated for subsequent positions. Calculations from the measurements determine any change in tilt. The measurements and calculations are used to derive a measure of the unevenness of the pavement surface.

8 Claims, 28 Drawing Sheets

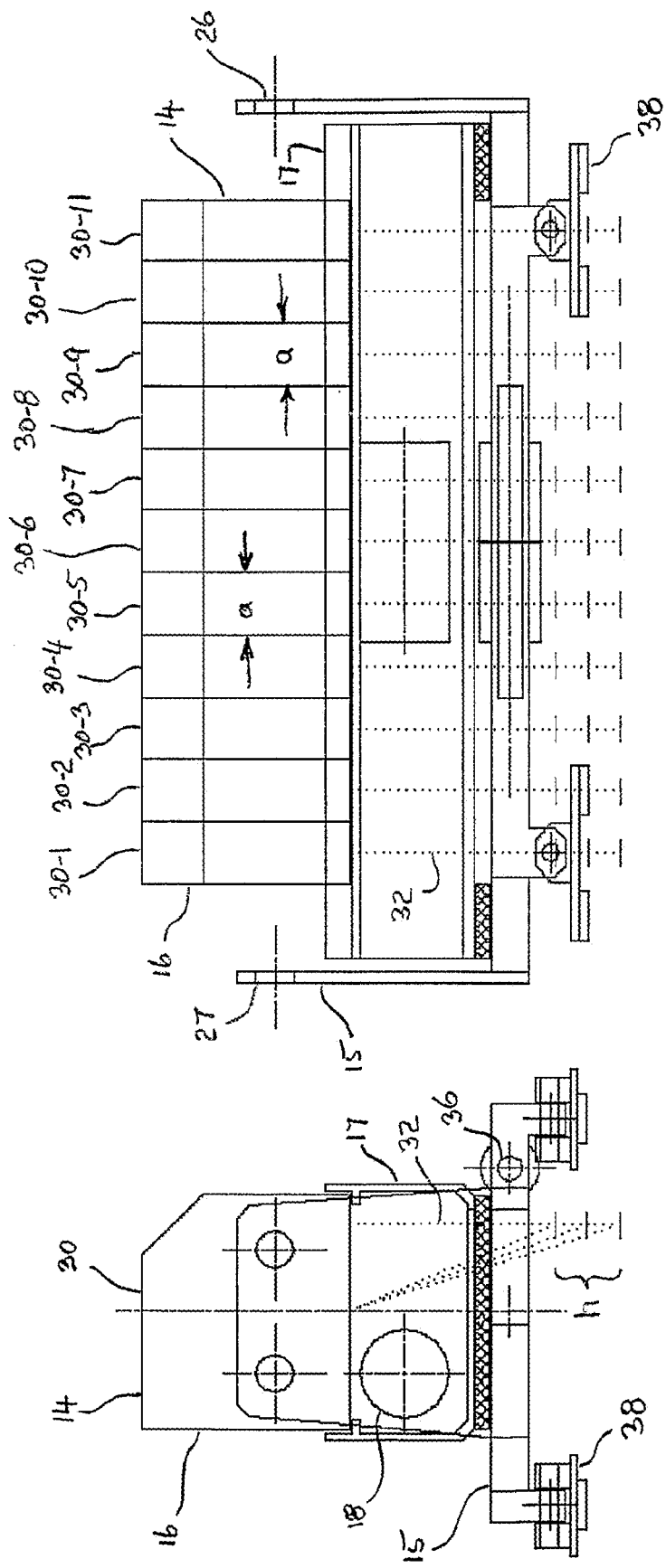

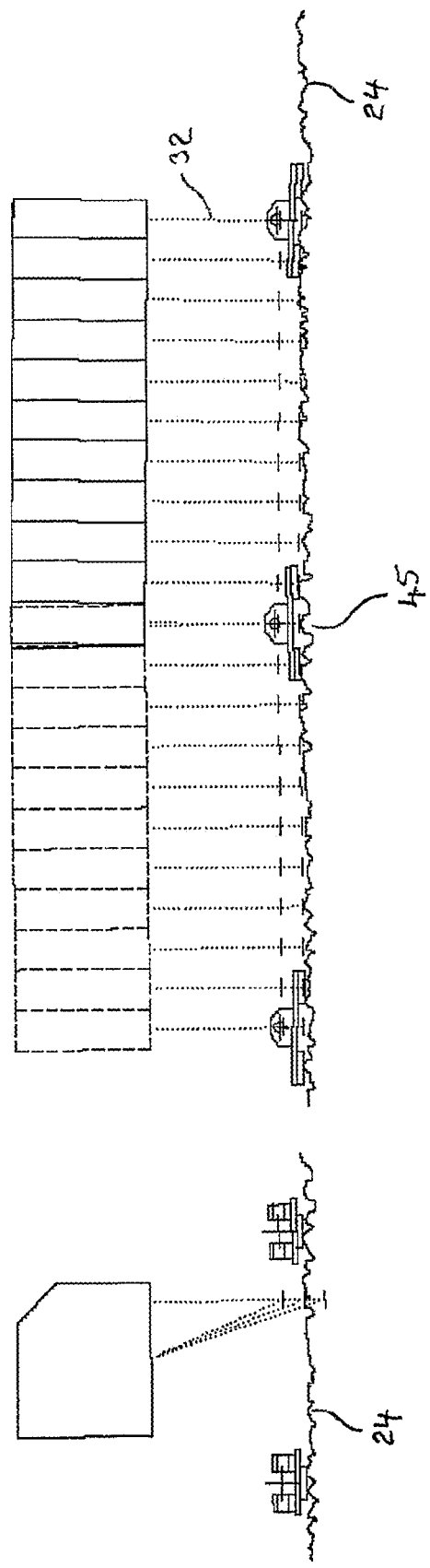

MEASUREMENT OF PAVEMENT UNEVENNESS

FIELD OF THE INVENTION

This invention concerns the use of devices to measure the unevenness of pavement surfaces. It is particularly applicable in the field of road roughness measurement and more particularly as an accurate means by which the accuracy of other measurement systems could be validated.

BACKGROUND TO THE INVENTION

Road surface unevenness, or road roughness, has a direct impact on the economics and efficiency of a nation's road transport system. It is an important indicator of road condition, in terms of road pavement performance, and as a major determinant of road user costs—fuel consumption and gaseous emissions, and vehicle wear and tear—and the relative degree of comfort or discomfort and fatigue experienced by people travelling.

To gauge the condition of the road network, government road agencies commission regular network level road roughness surveys to be conducted, commonly annually or biennially, and use the information from these surveys to allocate substantial funds to both maintain and further develop the road asset. The roughness surveys typically may cover in excess of 20,000 lane-kilometers and they are performed with highly sophisticated road profile measuring equipment travelling at highway speed. The cost of such surveys is typically about AU$800,000 or 20,000 lane kilometers and such surveys are expected to produce accurate and reliable road roughness information.

Validation of road roughness measurements carried out before, during and at the conclusion of major surveys continues to be hampered by the lack of suitable equipment for taking reference longitudinal profiles, particularly on highly textured surfaces. This can lead to anomalous roughness readings and discontinuities in historical roughness data. When problems occur they are generally not easily identified and corrected, and serious contractual issues can consequently arise between the government road agencies and the service provider.

Limitations of current reference profilers used for validating road roughness measuring equipment can be summarized as follows:

The horizontal distance increment at which height measurements are taken is too coarse, typically being greater than about 240 mm. On some surfaces this causes localised roughness features to be missed or poorly reproduced. These same features are recorded by highway-speed laser-based profilers, which are used almost exclusively for network level road roughness surveys worldwide, and whose measurements should be validated, using a reference profiler, before during and at the conclusion of major surveys.

The sensitivity of current reference profilers to coarsely textured surfaces is different to that of highway-speed laser-based profiling systems. This difference in sensitivity leads to equipment validation problems.

Current reference profilers can produce a bias error on textured surfaces.

Current reference profilers are sensitive to roughness in the 0.5 m to 50 m horizontal wavelength range only, and are largely insensitive to megatexture, which covers wavelengths in the range 50 mm to 500 mm. Megatexture is becoming of increasing importance to government road agencies.

An aim of the present invention is to provide a measurement system, particularly using a reference profiler, which overcomes, or at least minimises, these limitations.

Those skilled in the art of measuring pavement surface profiles understand the term "microtexture" to refer to irregularities having a wavelength up to 0.5 mm, the term "macrotexture" to refer to irregularities having a wavelength from 0.5 to 50 mm, and the term "megatexture" to refer to irregularities having a wavelength from 50 to 500 mm. The description in this patent specification follows that terminology. While the word "roughness" is a term commonly used by those skilled in the art to refer to irregularities having wavelength above 500 mm, in this specification the word "roughness" is also used in its general sense as meaning unevenness or the existence of irregularities of any size, unless the aforementioned size-limited meaning is obvious from the context.

SUMMARY OF THE INVENTION

In one aspect the invention provides a method of measuring the unevenness of a pavement surface comprising:
  (i) resting onto the pavement surface at a first position a sensor support frame carrying an array of sensors;
  (ii) measuring at the first position with each one of the sensors, a parameter indicative of the distance of said each one sensor from a respective first point on the pavement surface;
  (iii) transporting the sensor support frame to rest it on the pavement at a second position spaced a known distance and direction from the first position;
  (iv) measuring at the second position with each one of the sensors, a parameter indicative of the distance of said each one sensor from a respective second point on the pavement surface;
  (v) calculating from said measurements at the first position a profile of the surface at the first position;
  (vi) calculating from said measurements at the second position, and said known distance and direction, a profile of the surface at the second position and the relative position and alignment of said profiles;
  (vii) repeating the transportation, measurement and calculation steps progressively along the pavement surface to generate a sequence of profiles each with a known relative position and alignment; and
  (viii) generating, from said sequence of profiles known relative positions and alignments, an indication of the unevenness of the surface.

The method may include measuring the inclination of said array of sensors at said first and second positions and using said inclination measurements in said calculation of the profile of the surface.

Said first and second positions may be located such that said profile for the first position overlaps said profile for the second position, and said relative position and a matching of said overlapped portions are used in the determination of the inclination of the surface.

In another aspect the invention provides an apparatus for measuring the unevenness of a pavement surface, said apparatus comprising:
  (i) a sensor support frame;
  (ii) supports attached to the frame for resting the support frame on the pavement at a first location;
  (iii) an array of laser-based distance measuring sensors attached to the frame and directed downwards;

(iv) an inclination measuring sensor system attached to the frame for measuring the inclination of the frame, (iv) means for generating from said sensors a profile of the surface at the first location;

(v) means for lifting the support frame, moving the frame and lowering the frame to rest on the supports at a second location a set distance and direction from the first location;

(vi) means for generating from said sensors a profile of the surface at the second location;

(vi) means for generating from said profiles, said set distance and said inclination measurements a profile of the surface at the second position and the relative position and alignment of said profiles;

(vii) repeating the transportation, measurement and calculation steps progressively along the pavement surface to generate a sequence of profiles each with a known relative position and alignment; and (viii) generating, from said sequence of profiles known relative positions and alignments, a representation of the unevenness of the surface.

In a further aspect the invention provides a method for measuring the unevenness of a pavement surface comprising:

(i) transporting in a given direction above the pavement surface a sensor support frame carrying an array of sensors, said array having a plurality of sensors equi-spaced by a set distance and aligned in said given direction;

(ii) at a first position of said frame, measuring with each of said sensors and recording a parameter indicative of the distance of each said sensor from respective first points in a first array of points on the pavement surface;

(iii) while moving the sensor support frame in said given direction from the first position, measuring at a plurality of positions of said frame the parameter indicative of the distance of each said sensor from respective subsequent points on the pavement surface;

(iv) determining a second position of the frame when the sensors in said array are measuring the parameter from respective second points in a second array of points, said second array of points being displaced from said first array of points by a distance equal to the distance between adjacent said first points and in the direction of transportation, and recording for the sensors the parameter measurements at said second position of the frame;

(v) calculating from said measurements at the second position, any change in tilt of the frame between the first and second positions;

(vi) repeating steps (iii) to (v) allowing for said change in tilt when linking measurements to produce a continuous profile over multiple said positions of the frame;

(vii) repeating the transportation, measurement and calculation steps progressively along the pavement surface to generate a sequence of profiles each with a known relative position and alignment; and (viii) generating from said sequence of profiles known relative positions and alignments, an indication of the unevenness of the surface.

In a further aspect the invention provides a method for measuring the unevenness of a pavement surface comprising:

(i) transporting in a given direction above the pavement surface a sensor support frame carrying an array of sensors, said array having a plurality of sensors equi-spaced by a set distance and aligned in said given direction;

(ii) at a first position of said frame, measuring with each of said sensors and recording a parameter indicative of the distance of each said sensor from respective first points in a first array of points on the pavement surface;

(iii) while moving the sensor support frame in said given direction from said first position, measuring at a plurality of positions of said frame the parameter indicative of the distance of each said sensor from respective subsequent points on the pavement surface;

(iv) determining a second position of the frame when the sensors in said array are measuring the parameter from respective second points in a second array of points, said second array of points being displaced from said first array of points by a distance equal to the distance between adjacent said first points and in the direction of transportation, and recording for the sensors the parameter measurements at said second position of the frame;

(v) calculating from said measurements at the second position, an estimate of the position of a leading point in said second array of points;

(vi) while moving the frame from said second position to a third position, repeating steps (iii) to (v) for respective further points on the surface;

(vii) calculating from said measurements at the third position an improved estimate of the position of said leading point at said second position of the frame;

(viii) linking measurements to produce a continuous profile over multiple said positions of the frame;

(ix) repeating the transportation, measurement and calculation steps progressively along the pavement surface to generate an indication of the unevenness of the surface.

BRIEF DESCRIPTION OF THE DRAWINGS

In order that the invention may be more fully understood there will now be described, by way of example only, preferred embodiments and other elements of the invention with reference to the accompanying drawings where:

FIGS. 1A, 1B and 1C show respectively an end view, a side view and a plan view of a profiler according to a first embodiment of the present invention;

FIGS. 5 and 6 show the sensor array moved to a second position such that the reading from the rearmost sensor is a repeat of the reading from the forward-most sensor at the previous position;

Figure 1C:
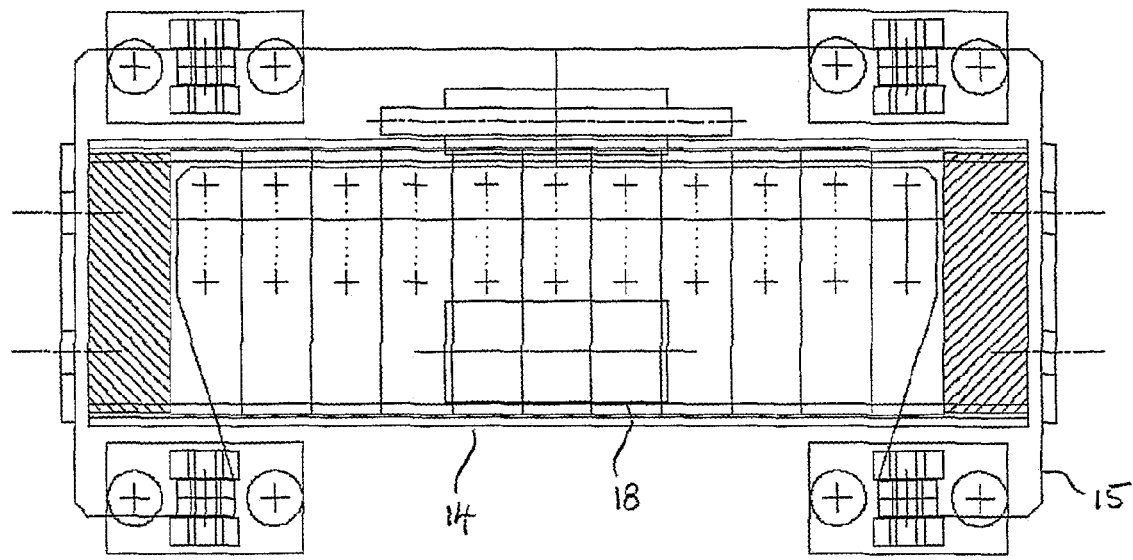
Figure 2:
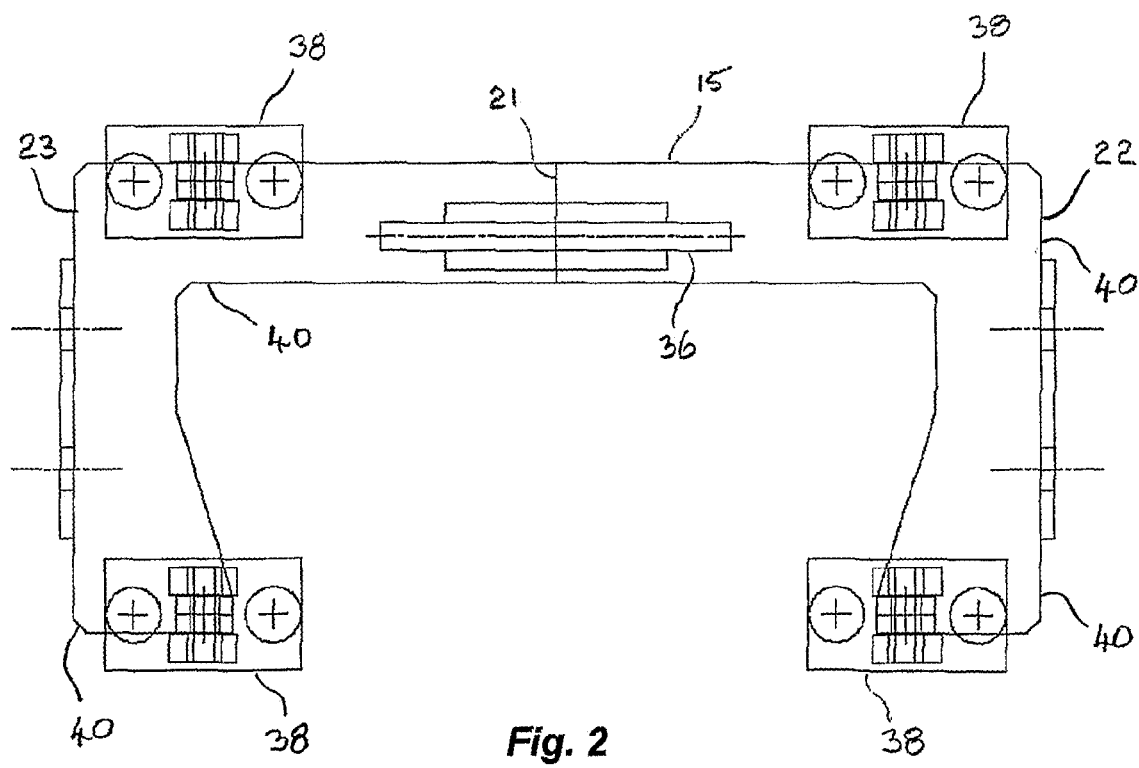
FIG. 2 shows a plan view of the main frame of the profiler shown in FIG. 3.
Figure 8:
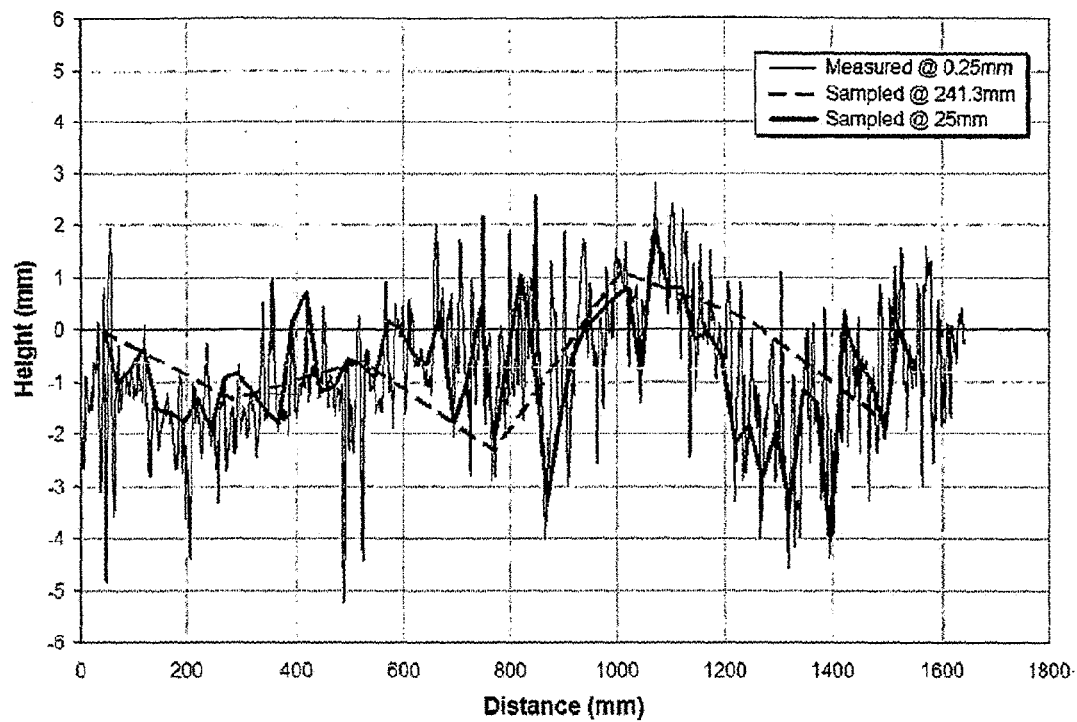
FIG. 8 shows road profiles from a very-low texture surface measured with high precision displayed at three sampling intervals, namely.
Figure 9:
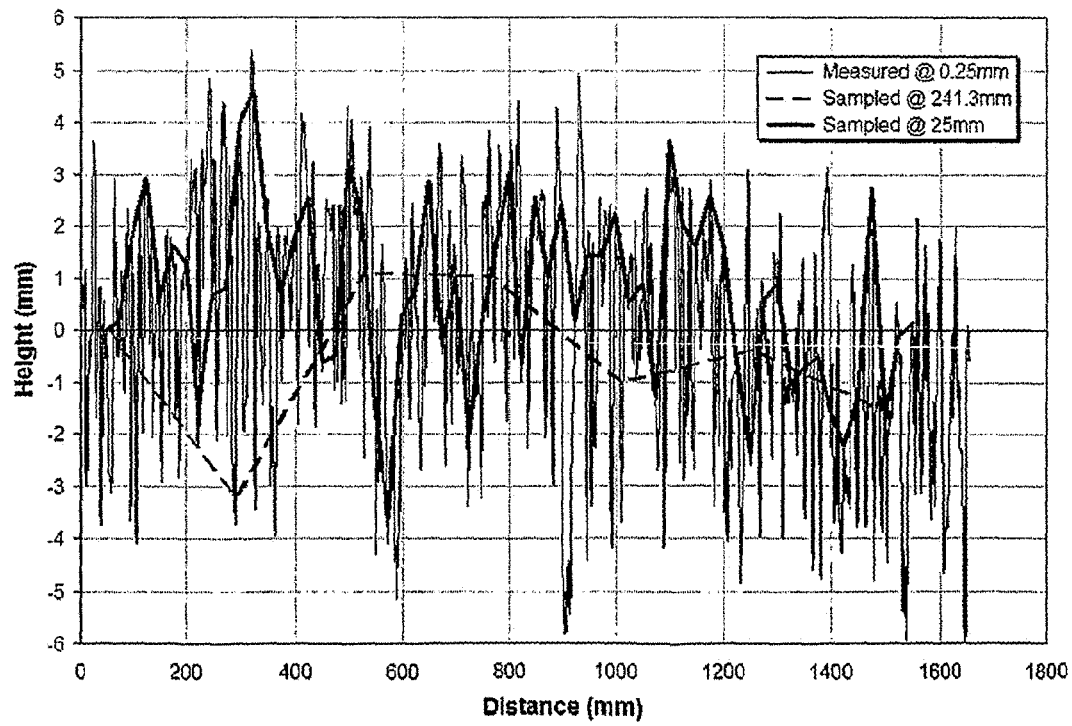
Figure 10:
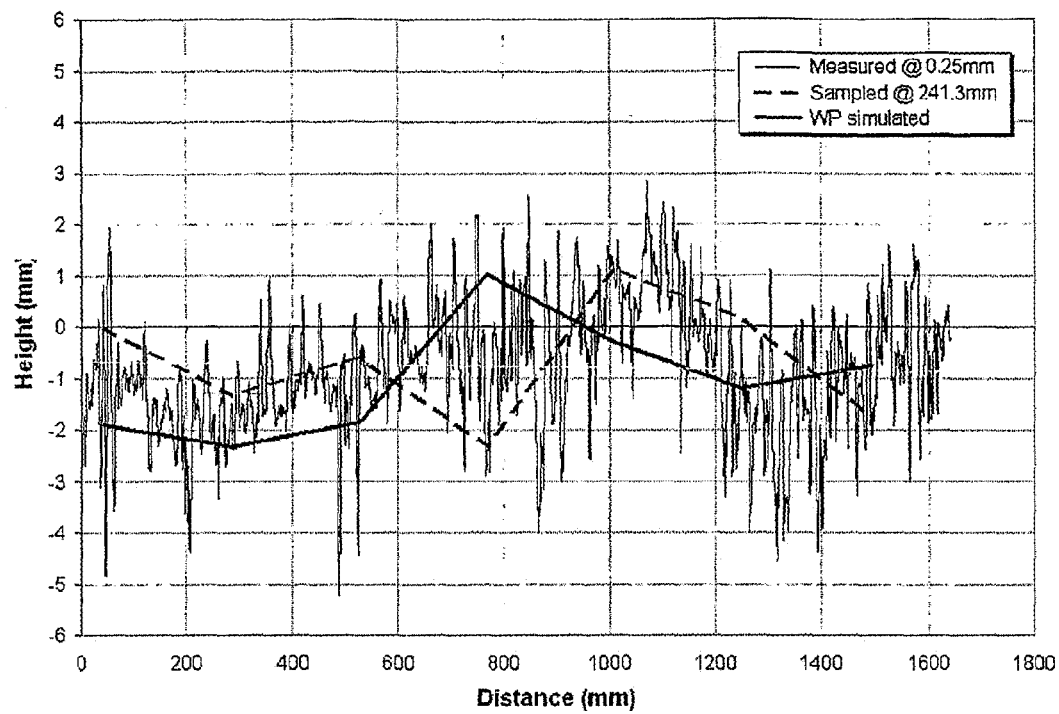
Figure 11:
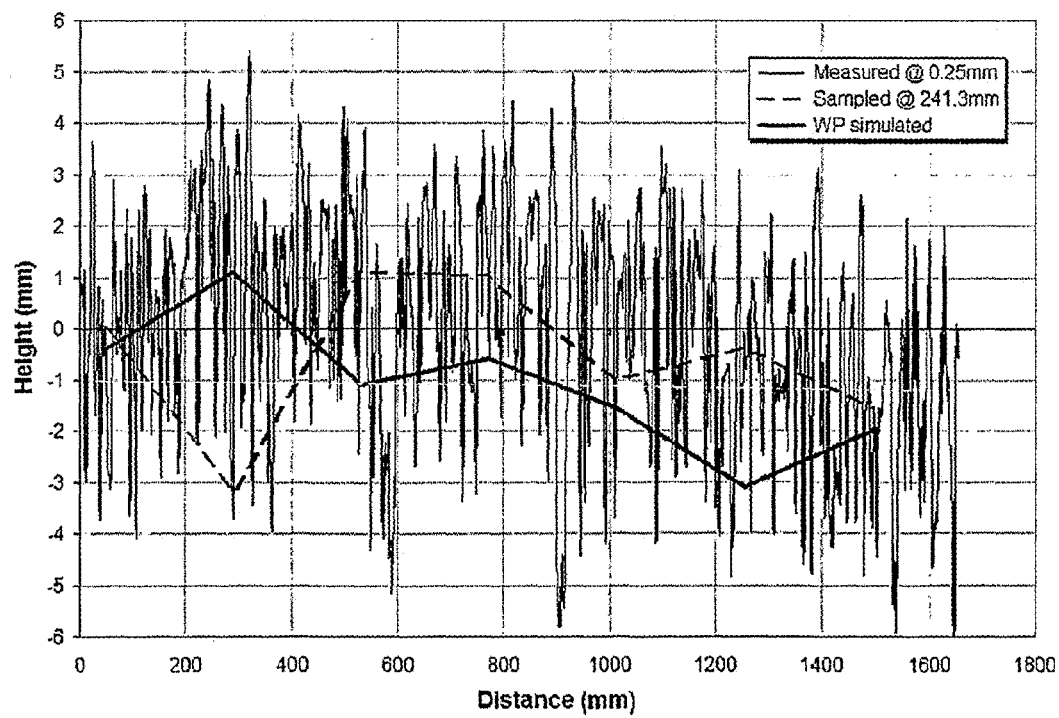
Figure 12:
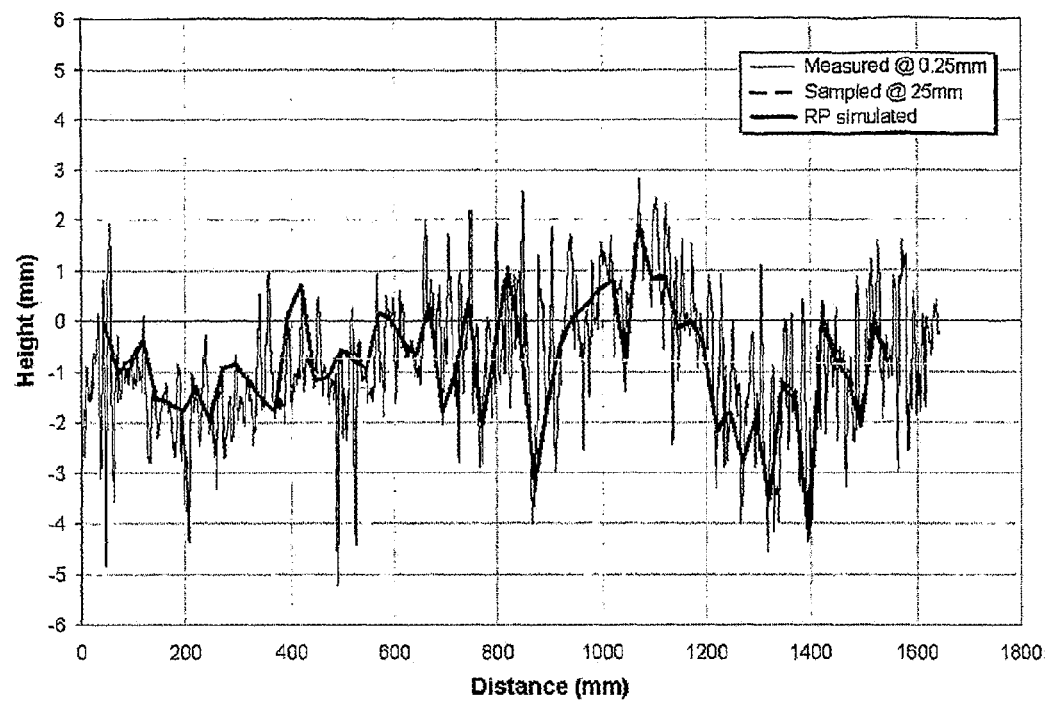
Figure 13:
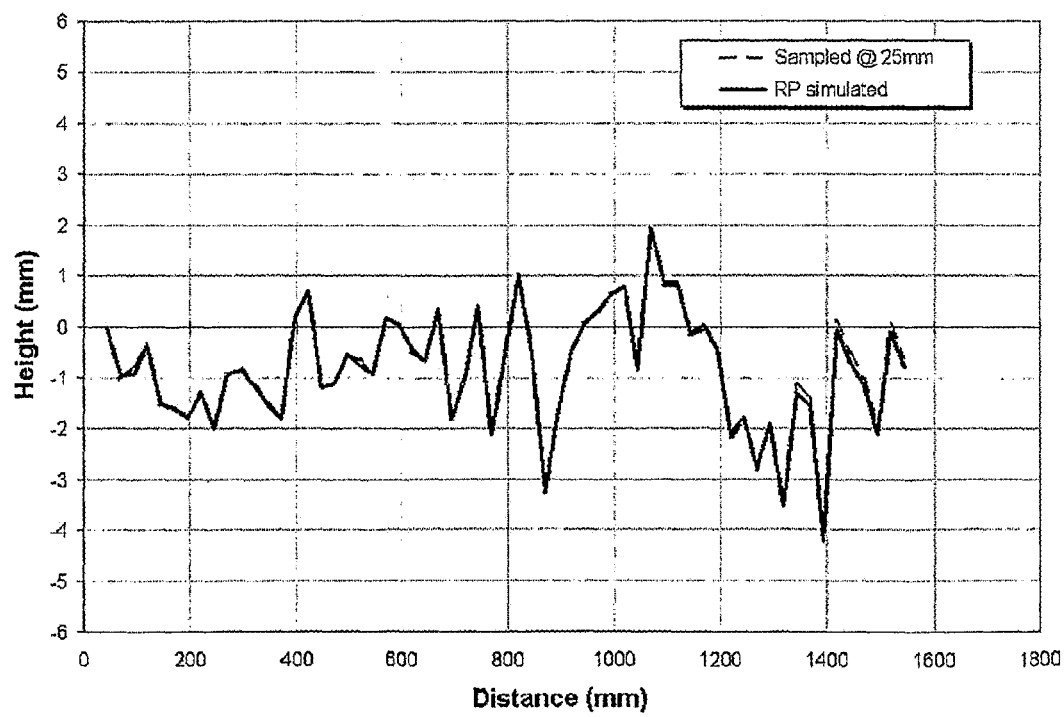
Figure 14:
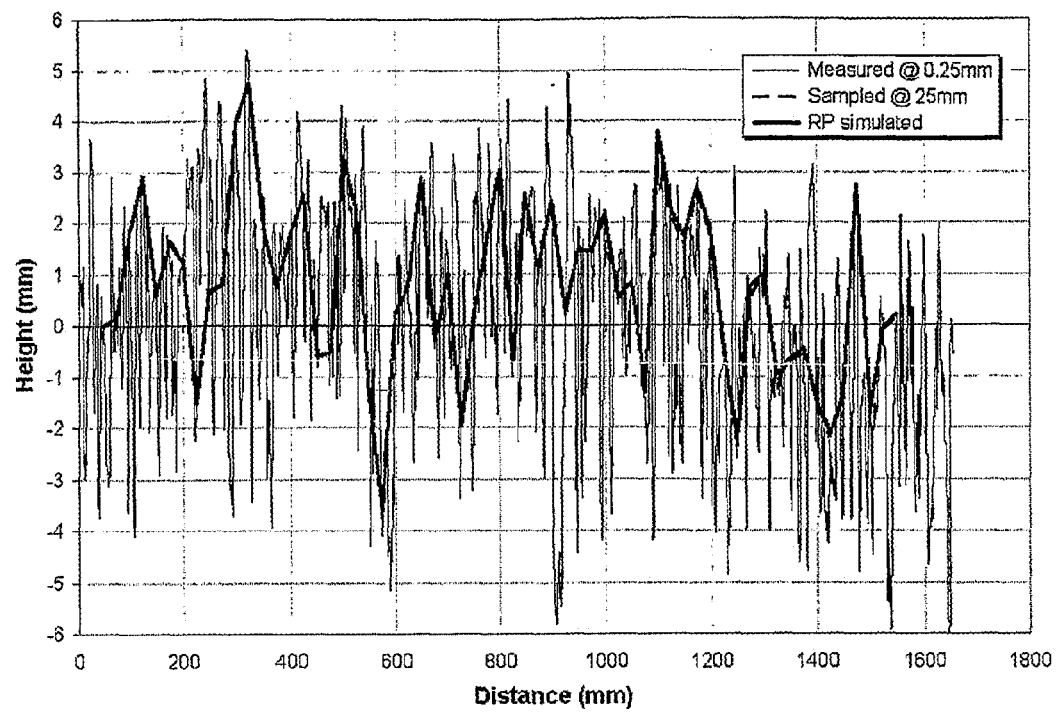
Figure 15:
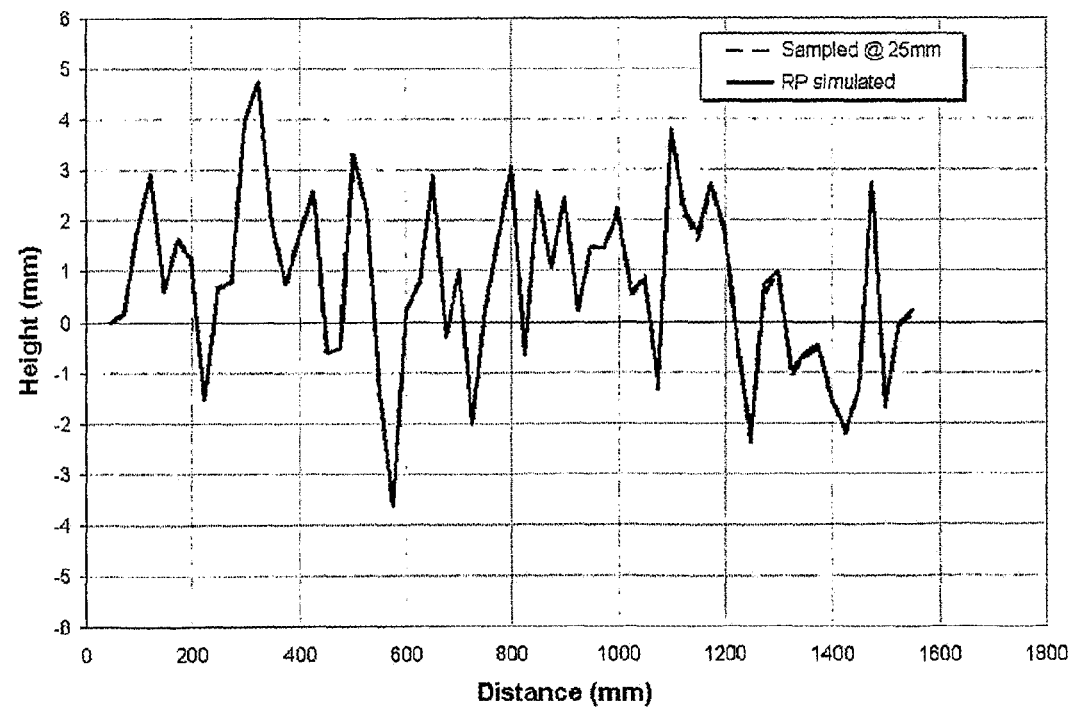
Figure 16:
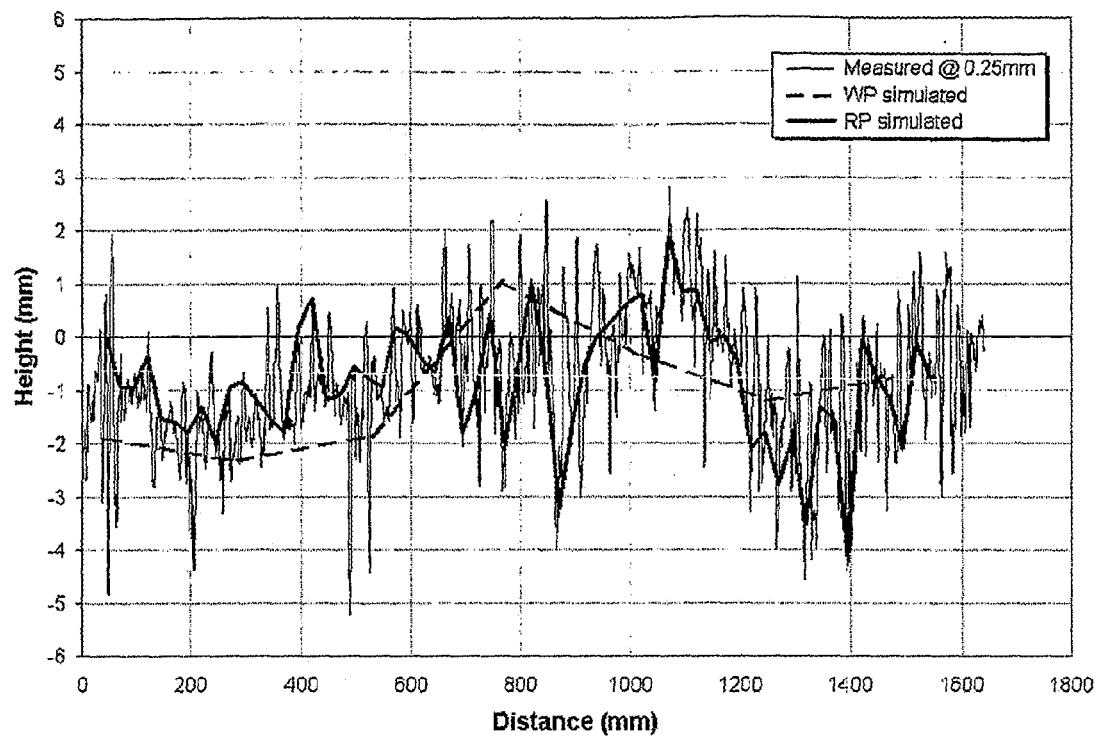
Figure 17:
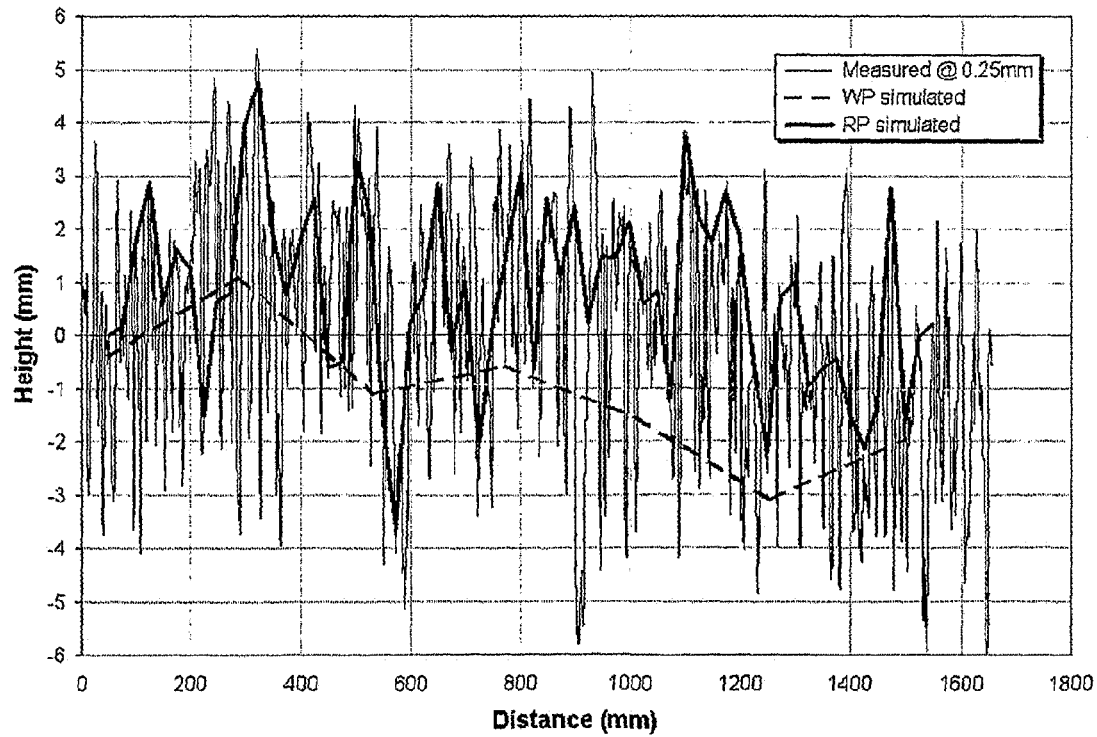
Figure 18:
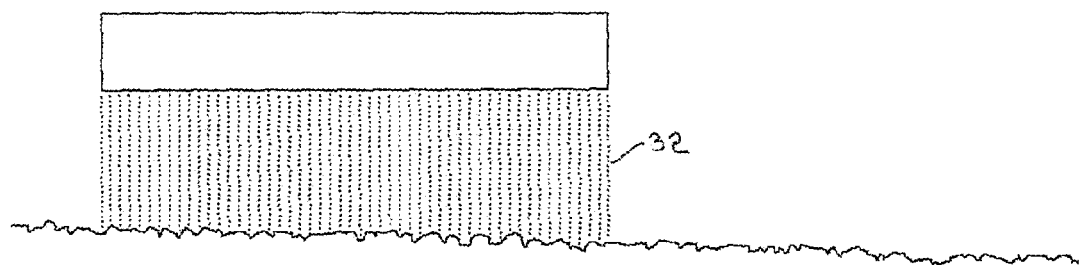
Figure 19:
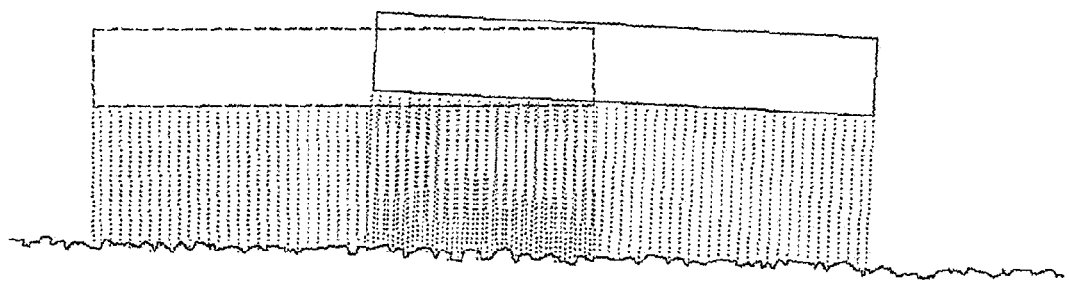
Figure 20:
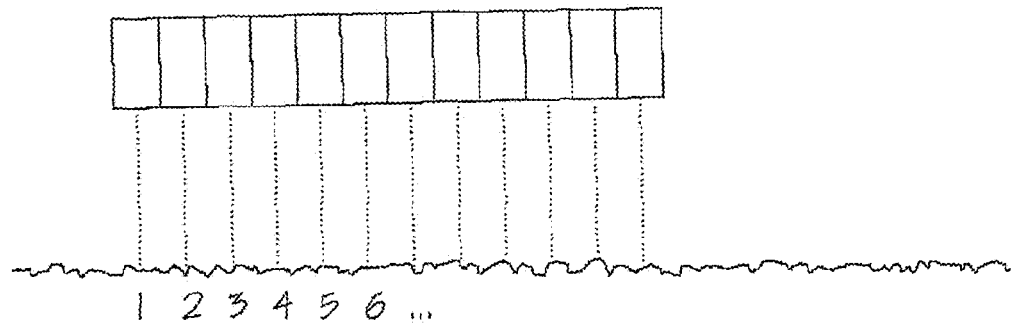
Figure 21:
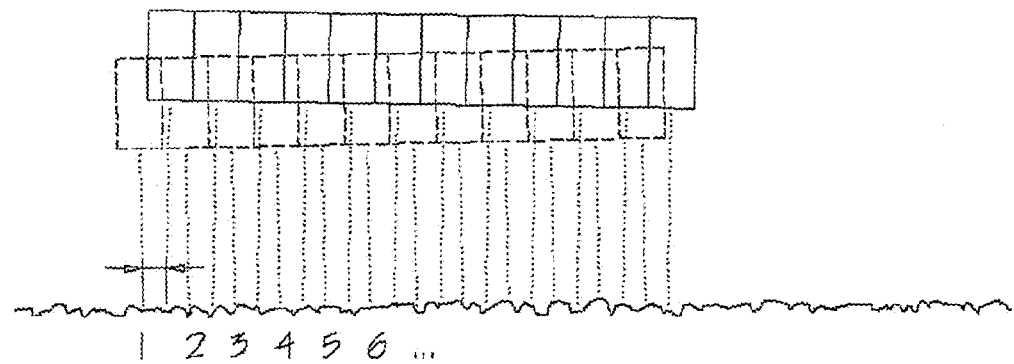
Figure 22:
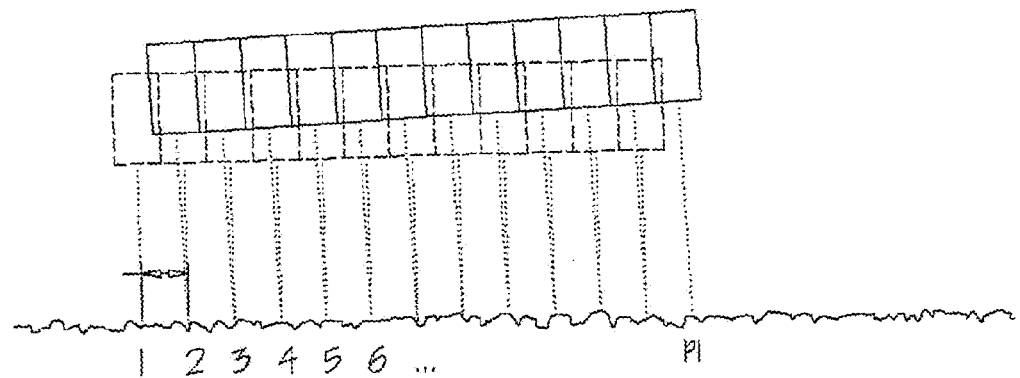
Figure 23:
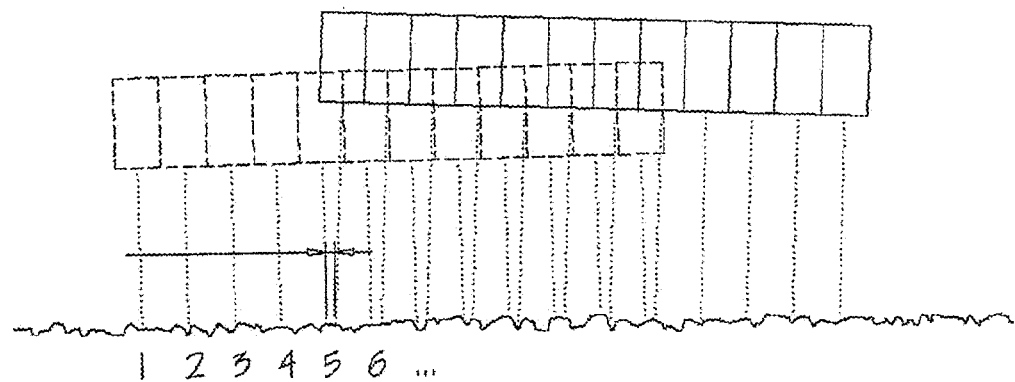
Figure 24:
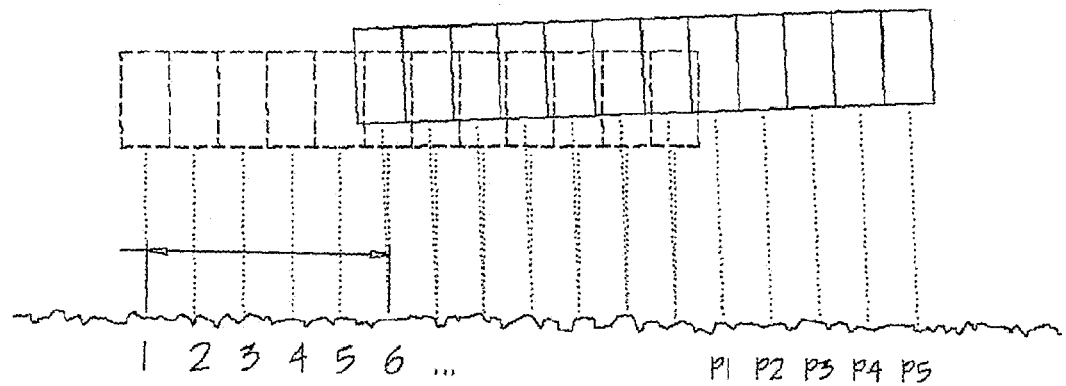
Figure 25:
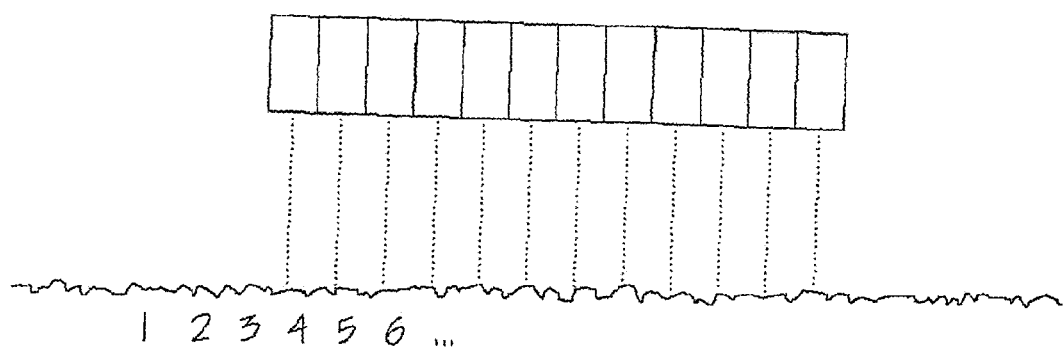
Figure 26:
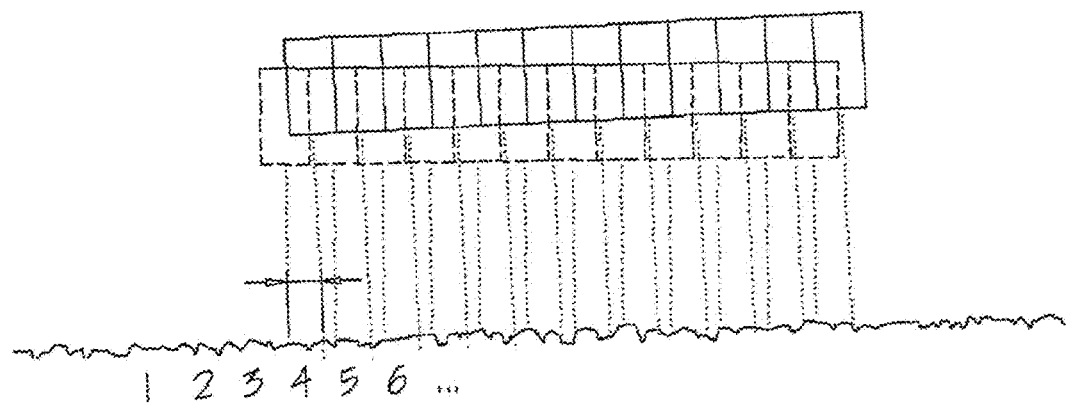
Figure 27:
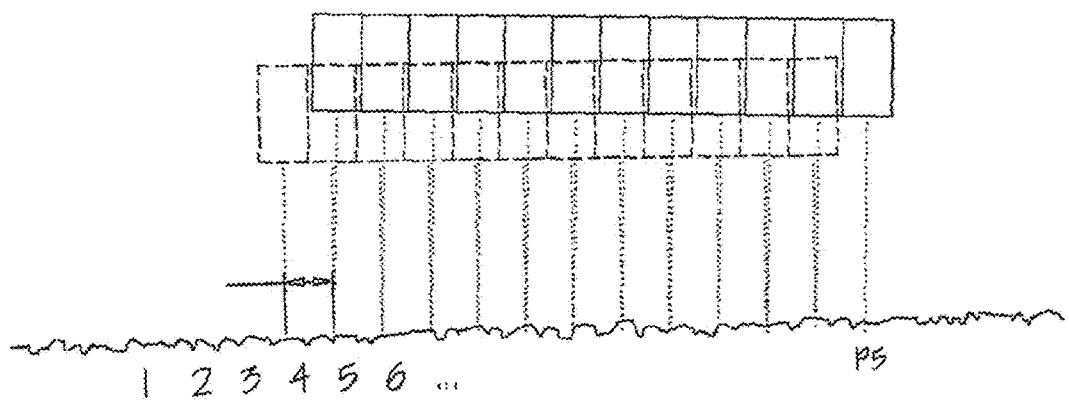
Figure 28:
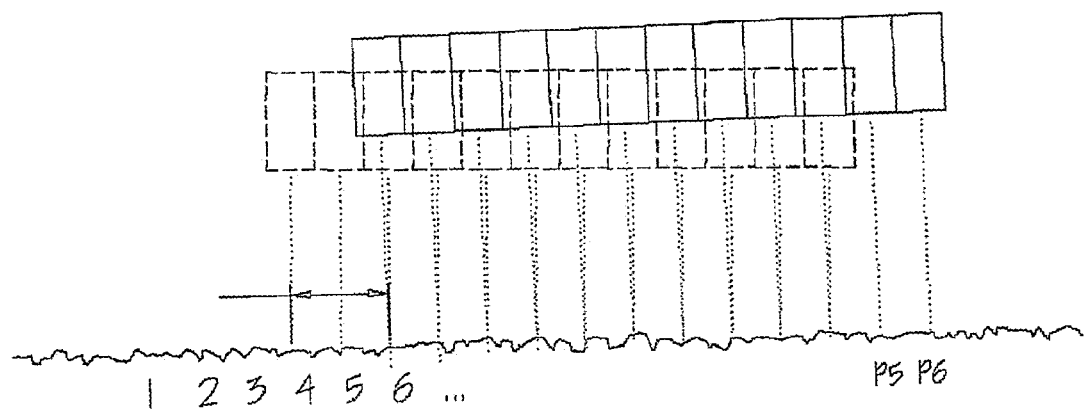
Figure 29:
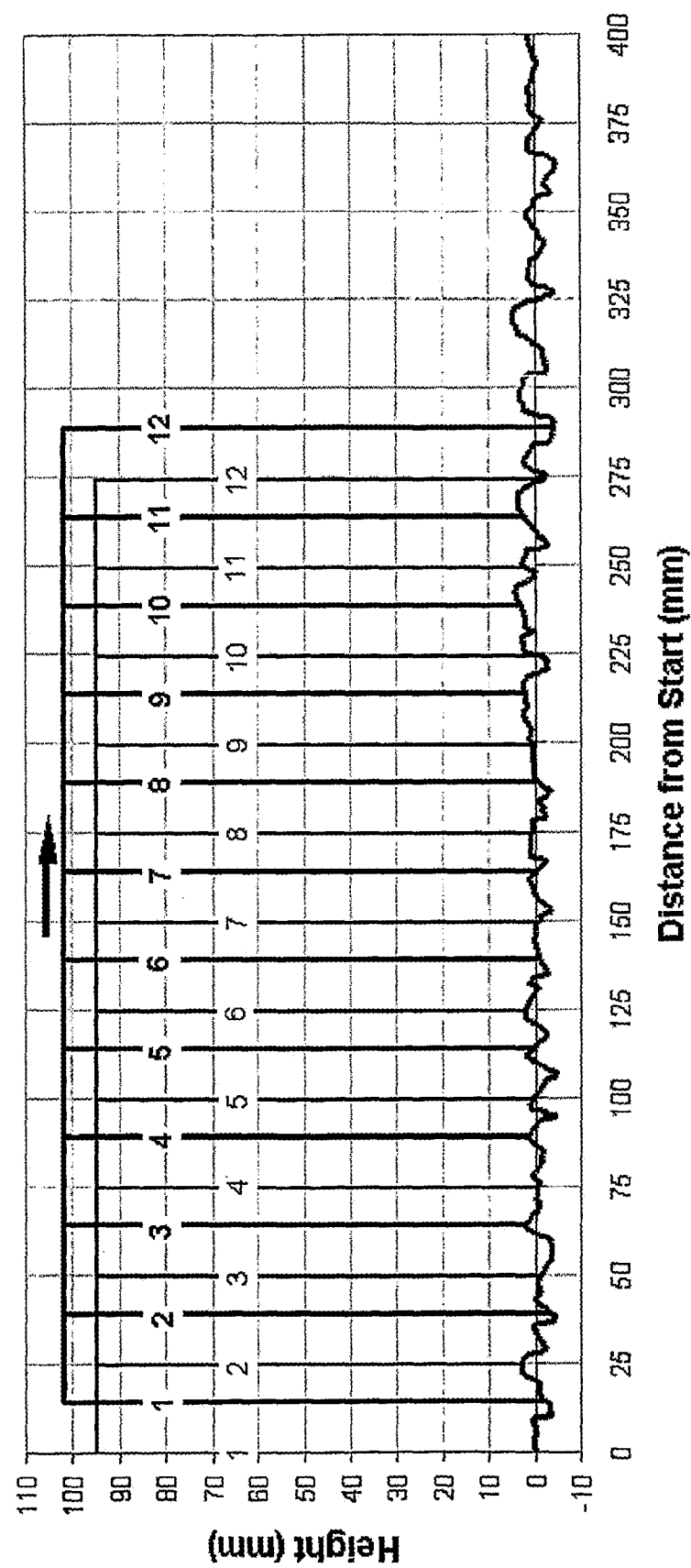
Figure 30:
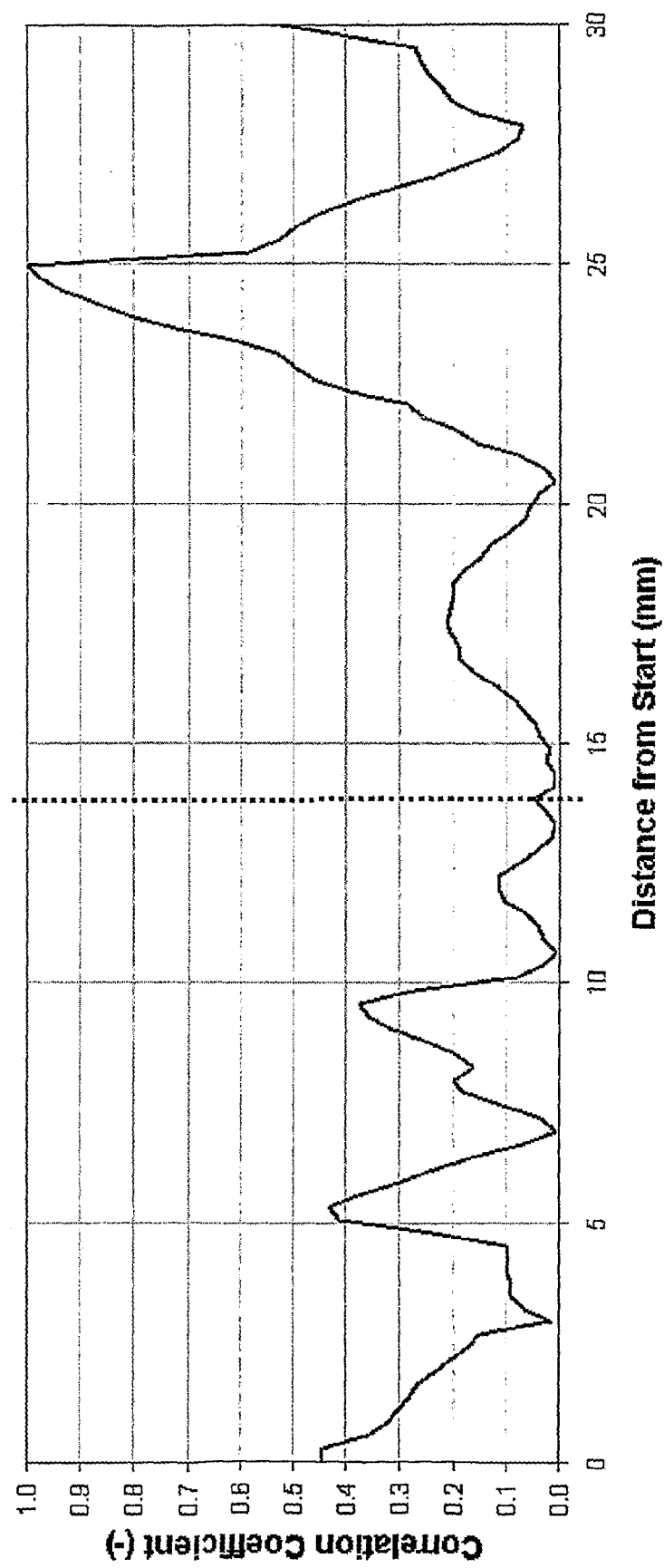
Figure 31:
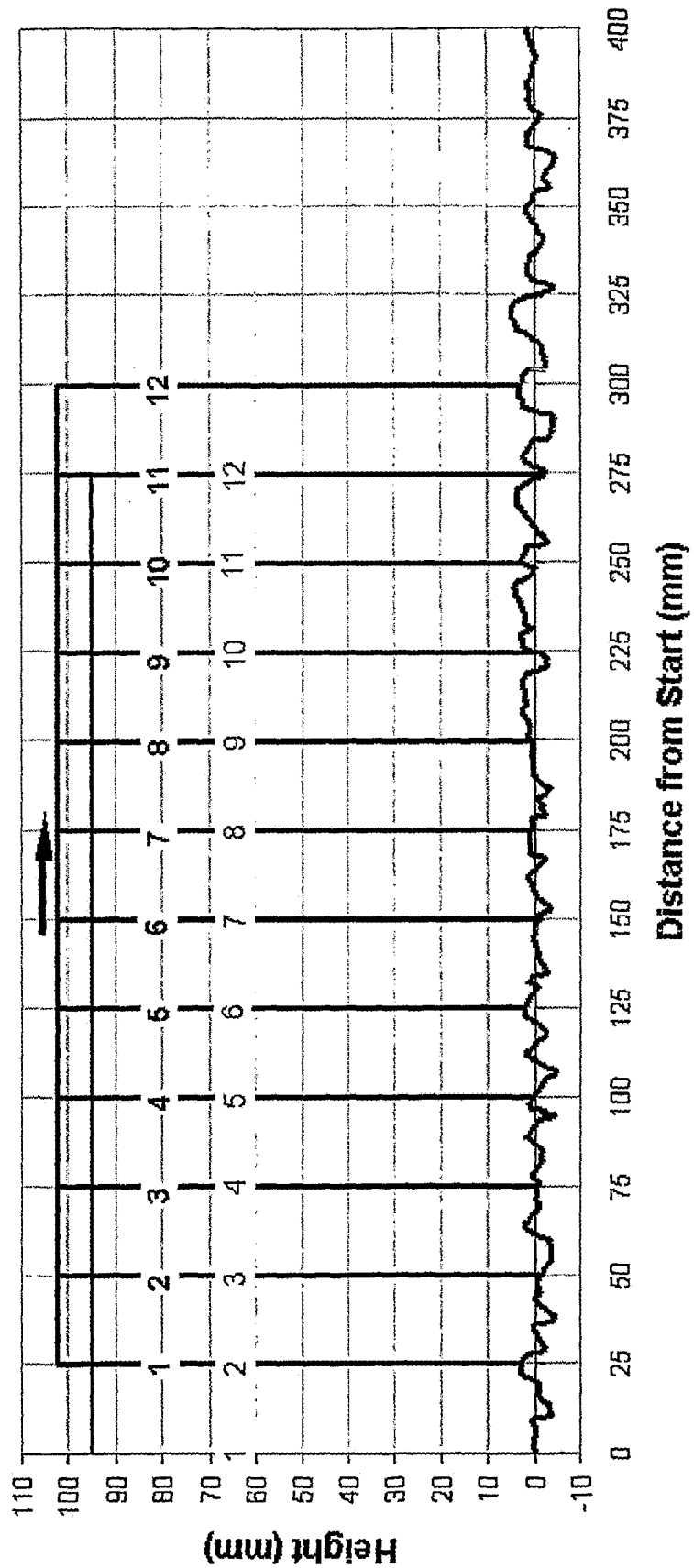
Figure 32:
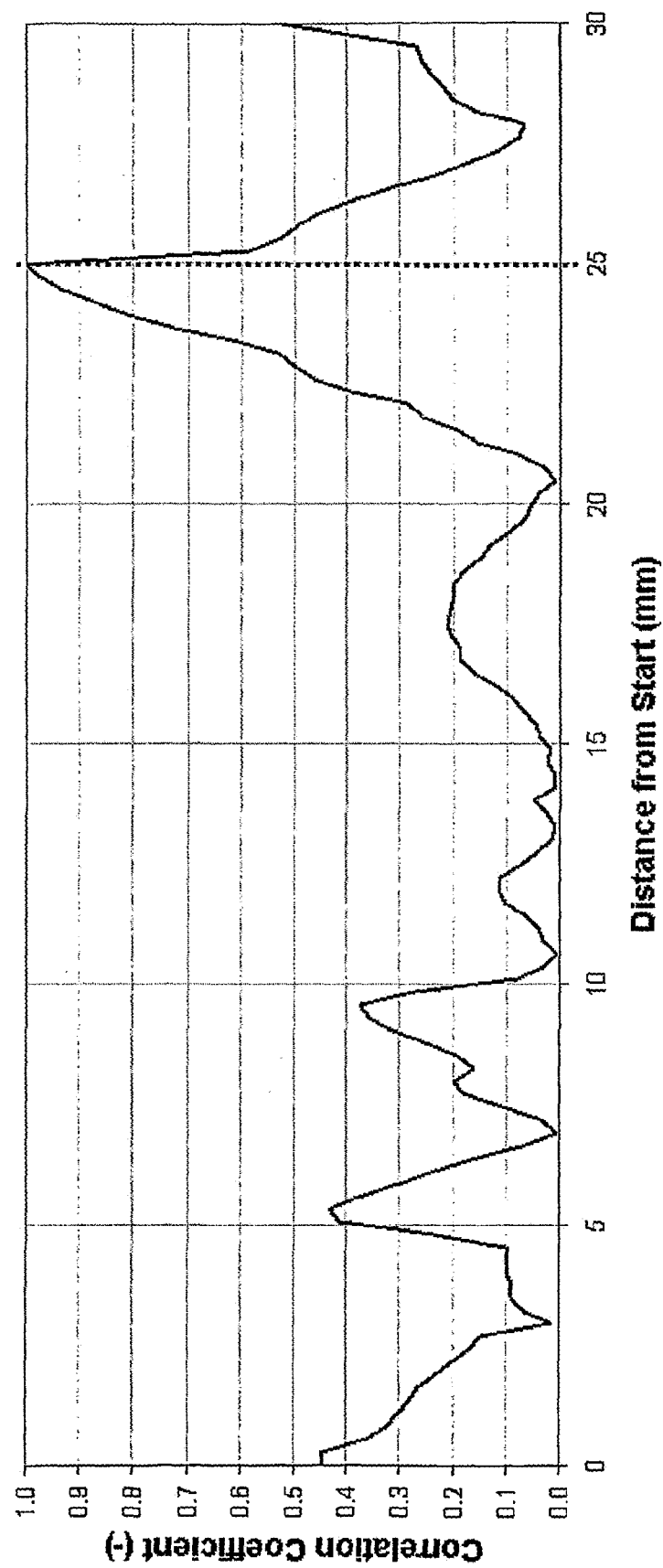
Figure 33:
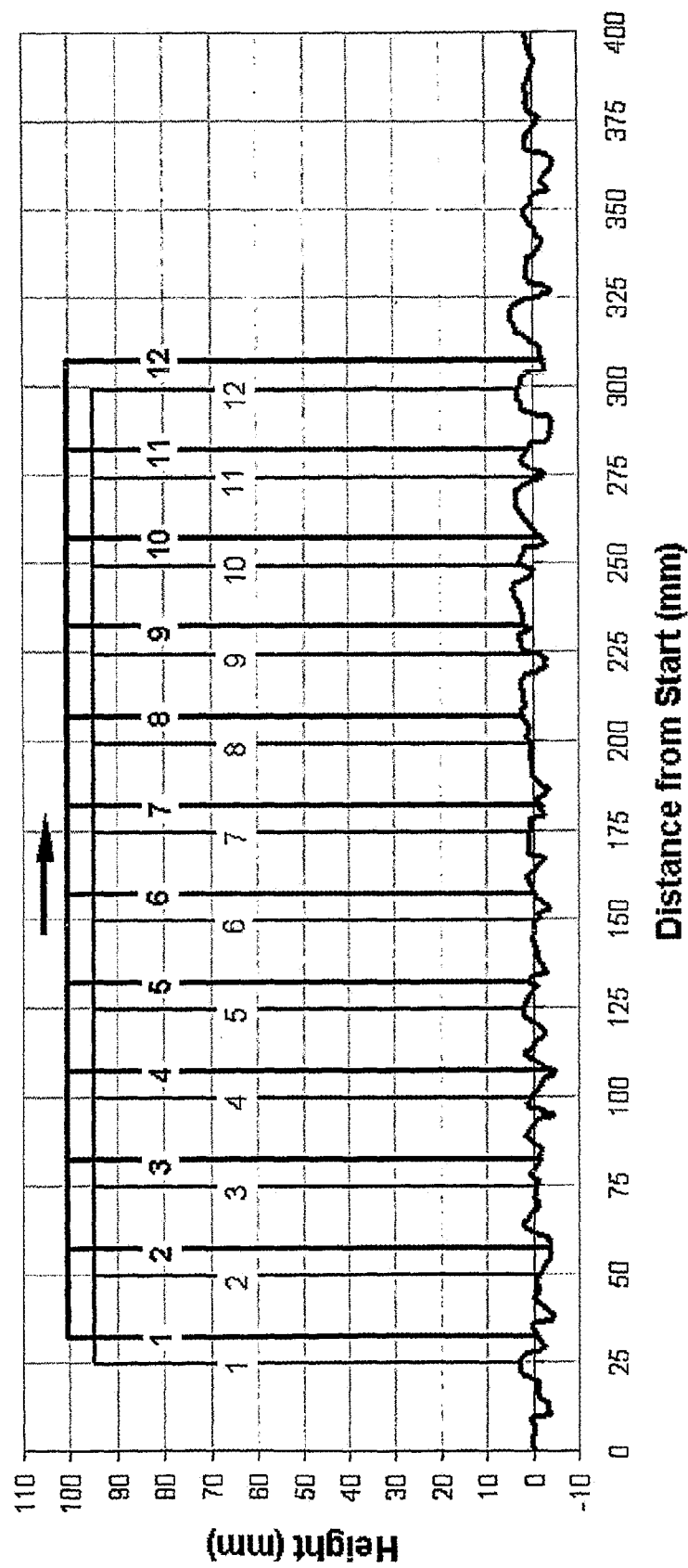
Figure 34:
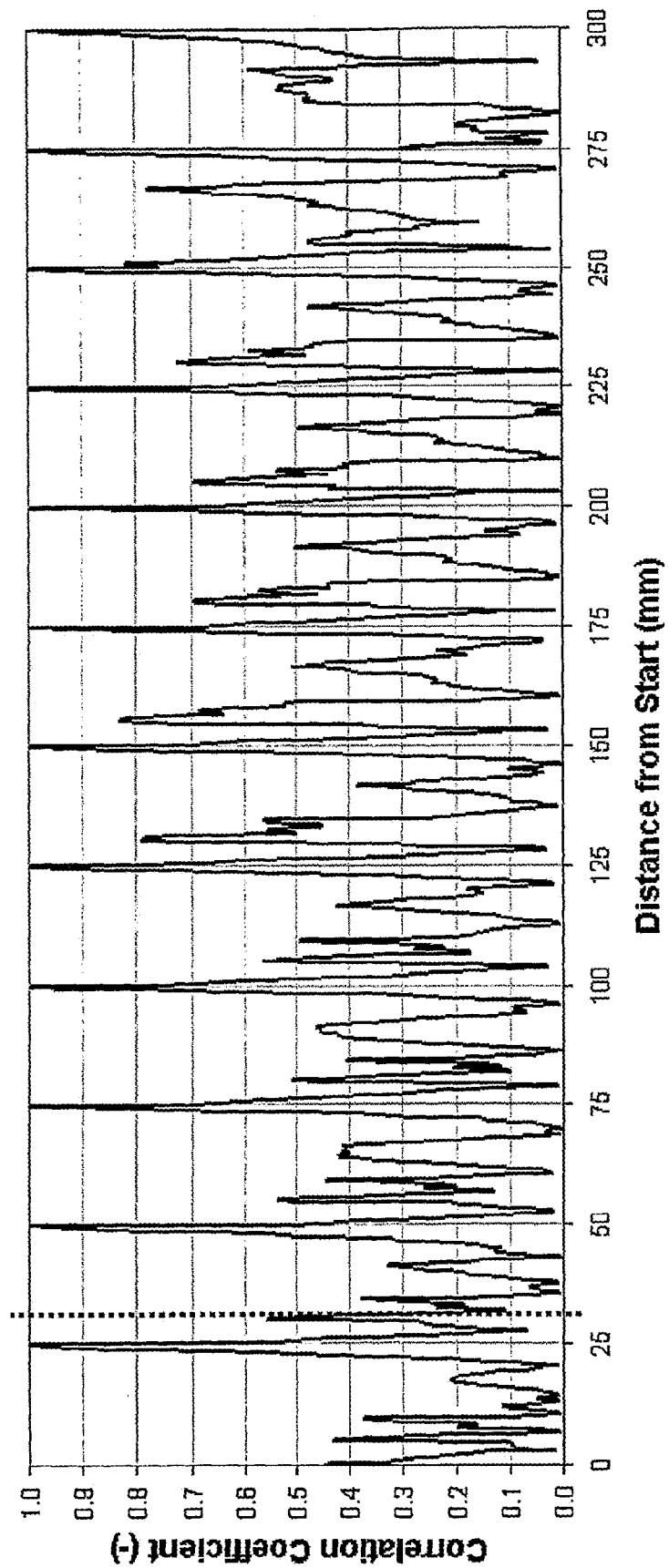
Figure 35:
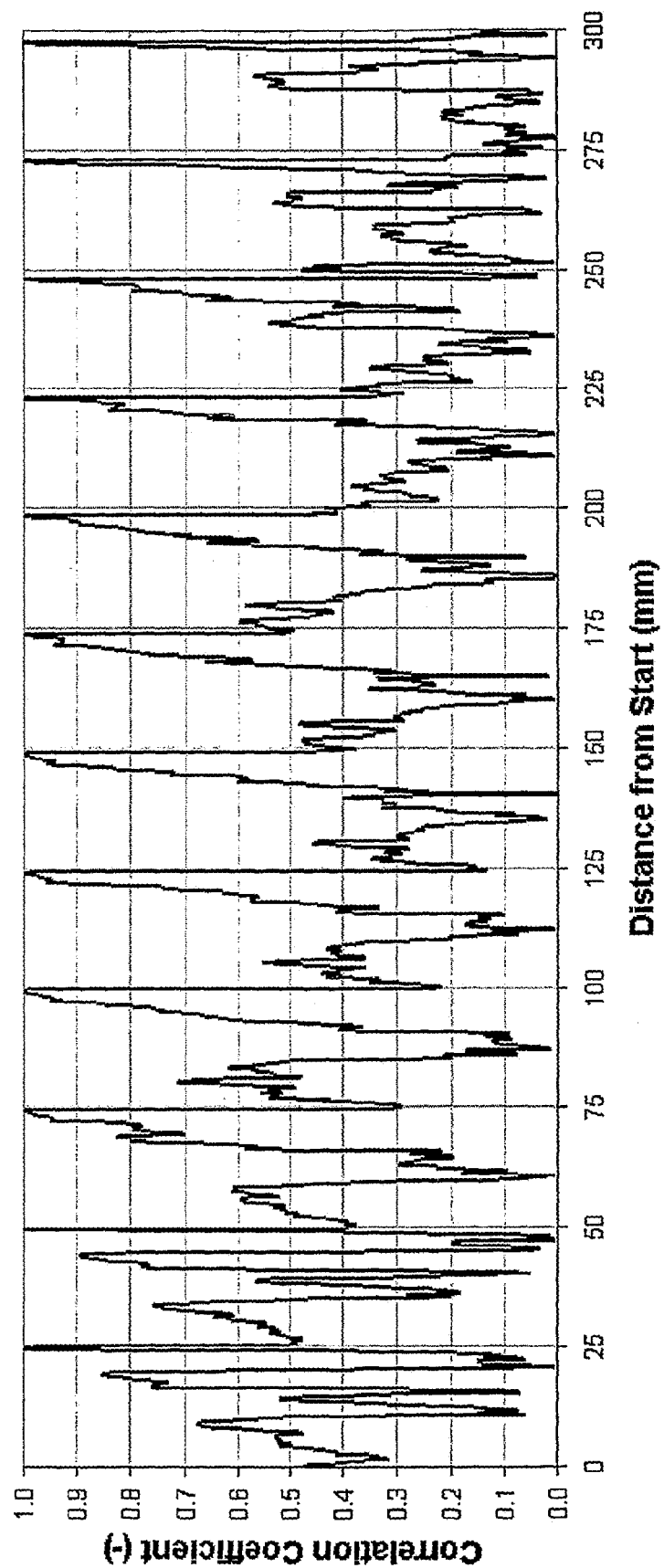
Figure 36:
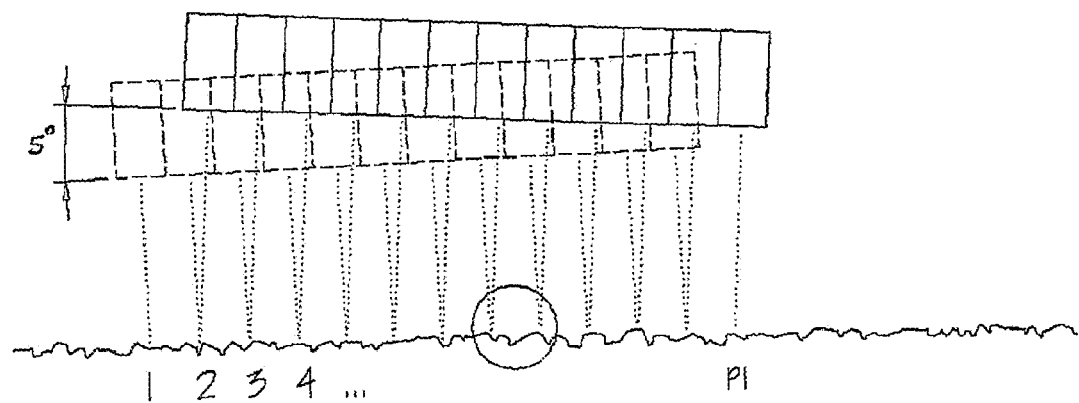
Figure 37:
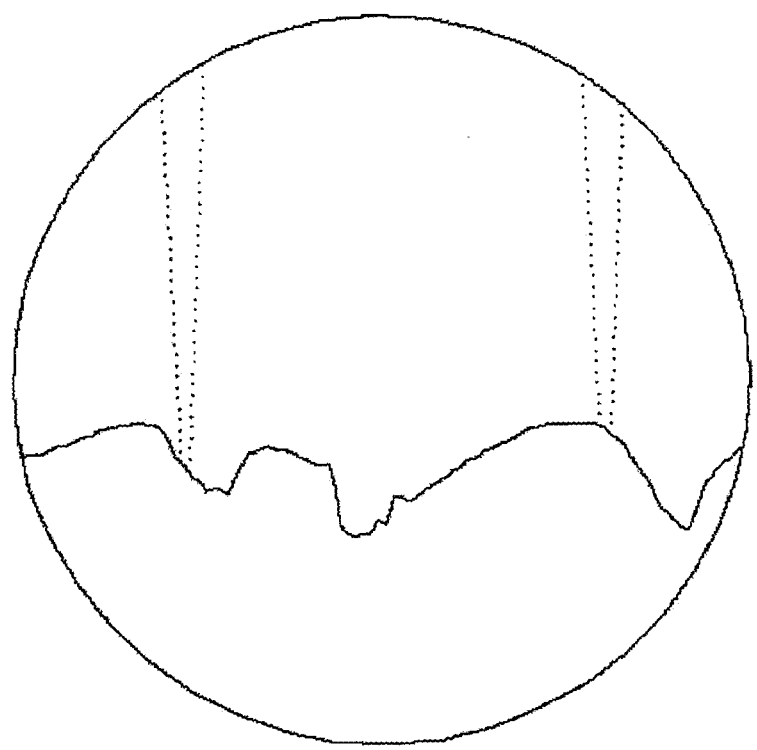
Figure 38:
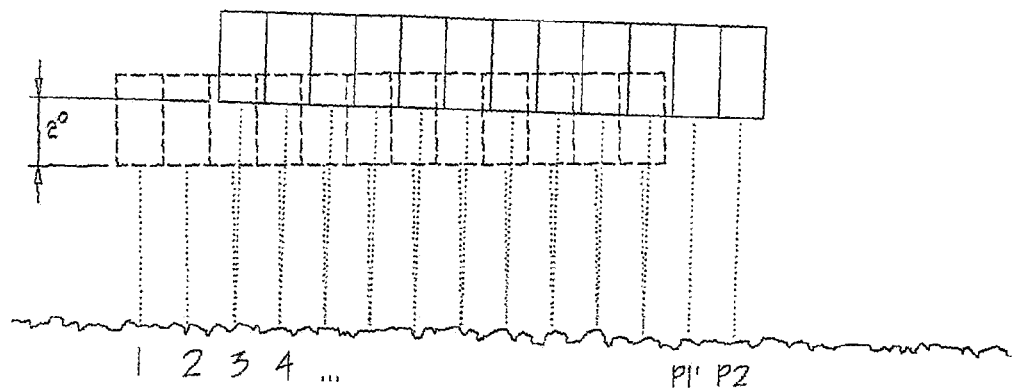
Figure 39:
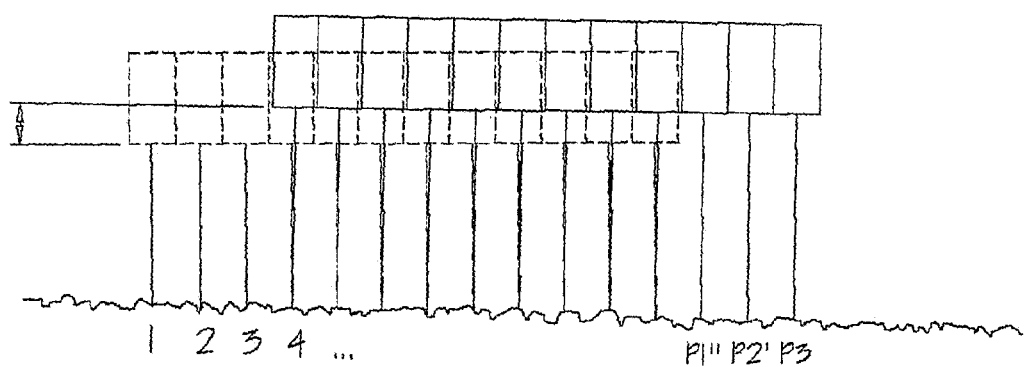
Figure 40:
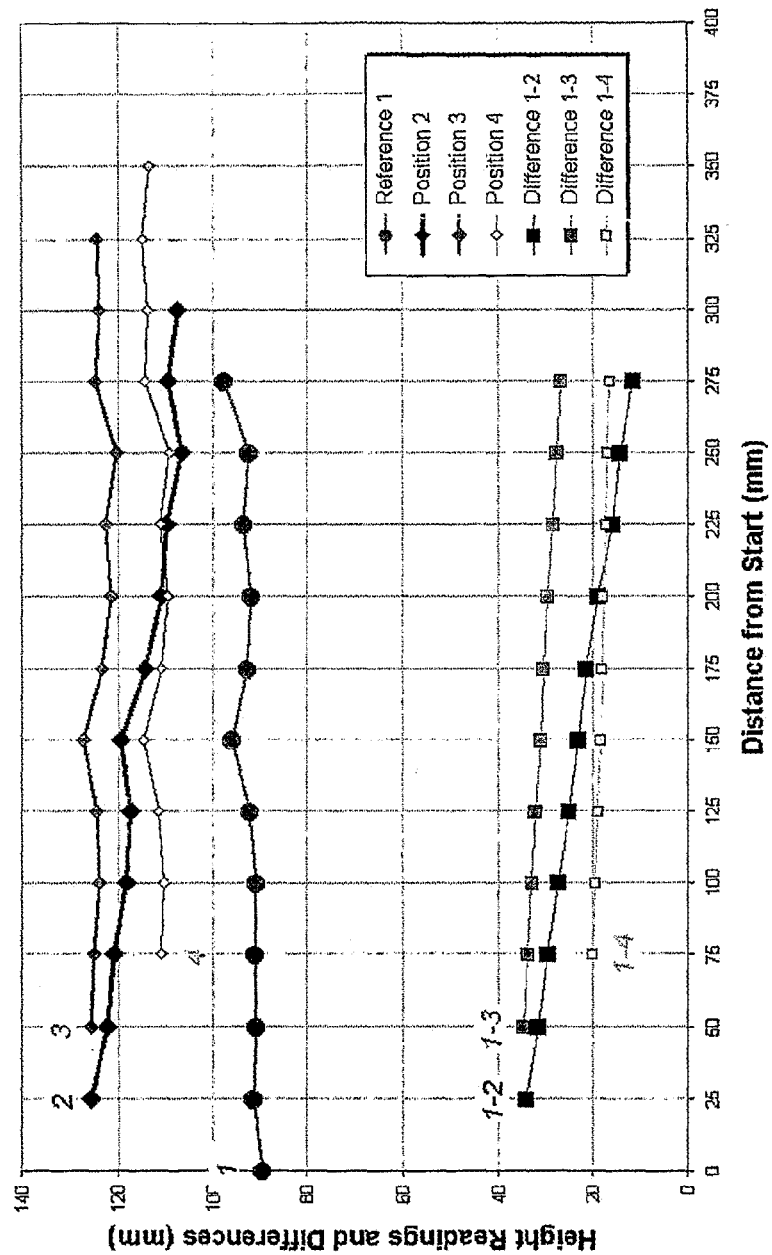
Figure 41:
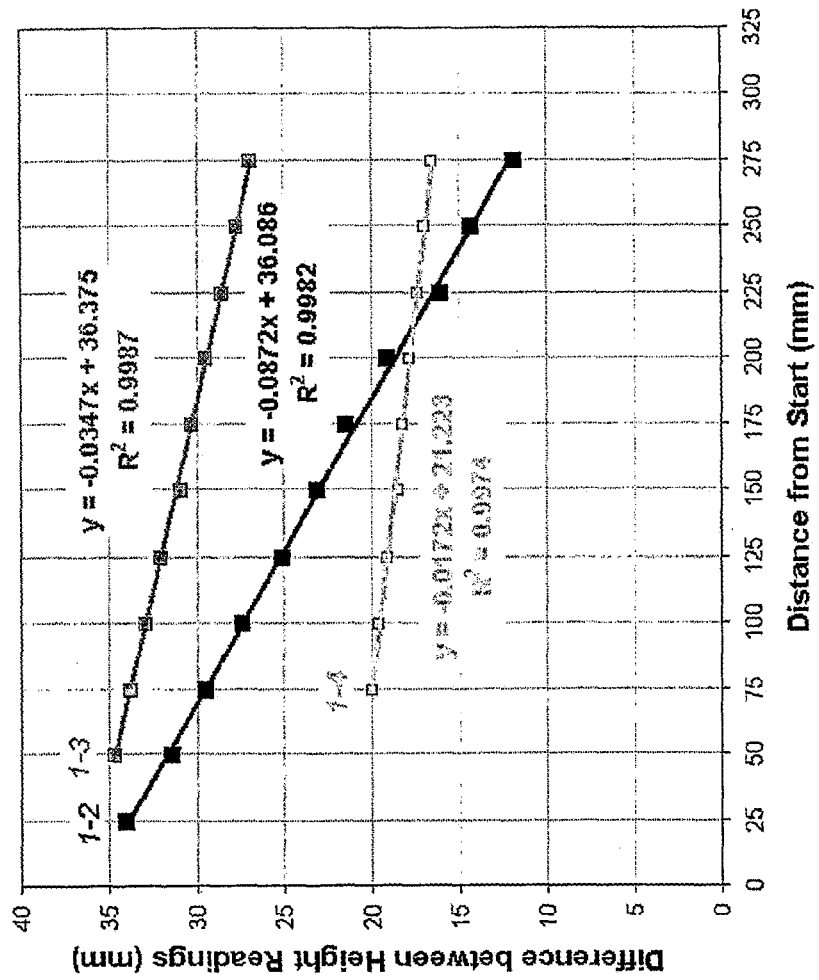

measured at 0.25 mm intervals by Transit New Zealand's Stationary Laser Profiler (herein referred to as the "SLP"), at 241.3 mm intervals as measured by a simulation of the Walking Profiler (herein referred to as the "WP") marketed by ARRB Group Ltd (formerly ARRB Transport Research Ltd), and at 25 mm intervals as measured by a simulation of the reference profiler (sometimes referred to herein as the "RP") shown in FIGS. 1 and 2;

FIG. 9 shows road profiles from a coarse texture surface measured with high precision displayed using the same three sampling intervals and techniques as for FIG. 8;

FIG. 10 shows measurements from a simulation of the Walking Profiler (WP) on very low texture surface compared with both the actual measured profile sampled at the same interval of 241.3 mm and the actual measured profile sampled at a finer interval of 0.25 mm;

FIG. 11 shows measurements from a simulation of the Walking Profiler on coarse texture surface compared with both the actual measured profile sampled at the same interval of 241.3 mm and the actual measured profile sampled at a finer interval of 0.25 mm;

FIG. 12 shows measurements from a simulation of the profiler shown in FIGS. 1 and 2 on very low texture surface compared with both the actual measured profile sampled at the same interval of 25 mm and the actual measured profile sampled at a finer interval of 0.25 mm;

FIG. 13 is the same as FIG. 12 but with the plot of the profile sampled at 0.25 mm deleted to show the remaining two plots more clearly;

FIG. 14 shows measurements from a simulation of the profiler shown in FIGS. 1 and 2 on coarse texture surface compared with both the actual measured profile sampled at the same interval of 25 mm and the actual measured profile sampled at a finer interval of 0.25 mm;

FIG. 15 is the same as FIG. 14 but with the plot of the profile sampled at 0.25 mm deleted to show the remaining two plots more clearly;

FIG. 16 shows a comparison of the plot for the Walking Profiler taken from FIG. 10 with two of the plots from FIG. 12;

FIG. 17 shows a comparison of the plot for the Walking Profiler taken from FIG. 11 with two of the plots from FIG. 14;

FIG. 18 shows diagrammatically a profiler according to a third embodiment of the invention, positioned at a first location;

FIG. 19 shows the profiler of FIG. 18 moved to a second location such that the surface being measured by its sensors overlaps the surface shown being measured in FIG. 18;

FIGS. 20 to 42 illustrate a fourth embodiment of the invention wherein:

FIG. 20 illustrates a sensor array of a profiler at a first position (Position 1) at the start of a profiling run;

FIG. 21 shows the sensor array of FIG. 20 having moved part way to a second position (Position 2) along a profiling run;

FIG. 22 shows the sensor array of FIG. 20 having moved completely to Position 2;

FIG. 23 shows the sensor array of FIG. 20 having moved a further distance along the profiling run;

FIG. 24 shows the sensor array of FIG. 20 having moved still further along the profiling run;

FIG. 25 shows the sensor array of FIG. 20 when it has moved completely to Position 4;

FIG. 26 shows the sensor array of FIG. 20 having moved part way from Position 4 to Position 5;

FIG. 27 shows the sensor array of FIG. 20 when it has moved completely to Position 5;

FIG. 28 shows the sensor array of FIG. 20 when it has moved completely to Position 6;

FIG. 29 shows two positions of a height sensor array during movement of the array over a pavement surface;

FIG. 30 shows a plot of the correlation coefficient between reference and intermediate height readings determined during simulated operation of the array corresponding to a position shown in FIG. 29;

FIG. 31 is an illustration similar to FIG. 29 but showing the height sensor array moved further along;

FIG. 32 is a plot of the correlation coefficient between reference and intermediate height readings determined during simulated operation of the array corresponding to a position shown in FIG. 31;

FIG. 33 is an illustration similar to FIG. 31 but showing the height sensor array moved still further along;

FIG. 34 is a plot of the correlation coefficient between reference and intermediate height readings taken on a coarse textured surface;

FIG. 35 is a plot of the correlation coefficient between reference and intermediate height readings taken on a smooth textured surface;

FIG. 36 shows a sensor array at a one step-distance increment along the profile;

FIG. 37 shows a detail enlargement of a portion indicated on FIG. 36;

FIG. 38 shows the sensor array at two step-distance increments along the profile;

FIG. 39 shows the sensor array at three step-distance increments along the profile;

FIG. 40 shows plots of actual reference height readings corresponding to various positions of the sensor array;

FIG. 41 shows plots of data calculated from data in FIG. 40; and

Figure 42:
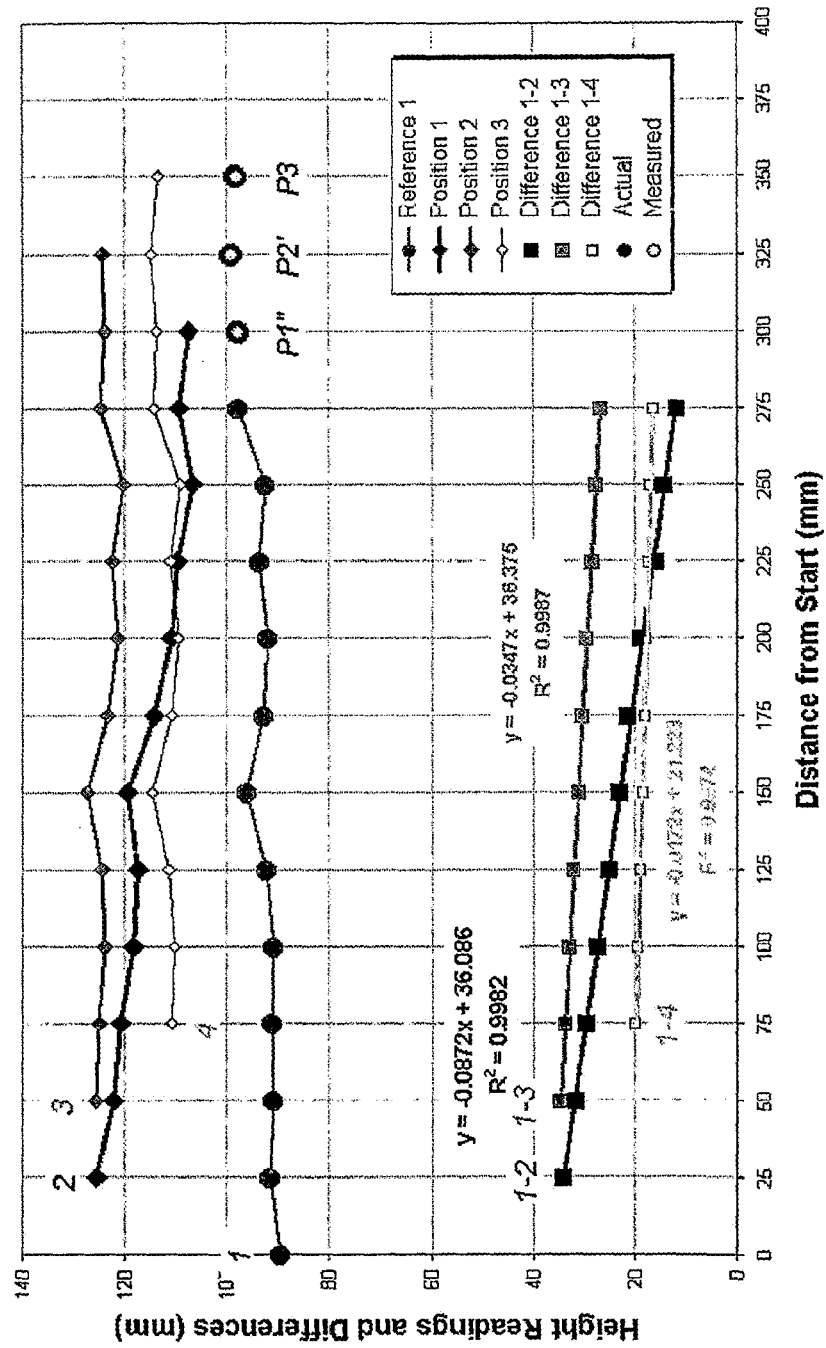

FIG. 42 shows the data in FIG. 40 together with additional calculated results.

DESCRIPTION OF THE PREFERRED EMBODIMENT AND OTHER EXAMPLES OF THE INVENTION

Referring to FIGS. 1 to 7, the profiler 14 shown comprises a main frame 15 which has a squared-off C-shape when viewed in plan and a channel-shaped measuring beam 17 mounted to the main frame 15. A height sensor array 16 is mounted into the measuring beam and an inclination measuring transducer 18 is affixed to the sensor array 16. A shock absorbing foam rubber pad 20 is mounted between the frame 15 and the measuring beam 17.

A foot 38 is mounted rigidly at each respective corner 40 of the frame 15. The frame 15 is split in half across its middle portion 19 and joined such that the leading end 22 of the frame 15 may pivot relative to the trailing end 23 of the frame on a shaft 36 aligned horizontally and longitudinally relative to the frame. The leading end 22 and the trailing end 23 thus provide pivoting end supports to locate the array 16 at a nominal distance above the road (pavement) surface 24. The pivoting nature allows all four feet 38 to rest in contact with the road surface 24 in all reasonable situations.

The frame 15 also includes raised carry points 26 and 27 for raising, transporting and lowering the sensor array 16 from one measuring location to the next adjacent measuring point along the path being profiled.

In the typical application shown in FIGS. 1A, 1B, 1C and 2, the height sensor array 16 comprises eleven non-contact laser-based height sensors 30-1 to 30-11, clamped side-by-side to form a straight linear array 16 of equally-spaced height sensing elements aligned in the direction of measurement. Each sensor 30 is an Optocator model 2301 sensor as sold by LMI Technologies AB of Sweden. The laser beams 32-1 to 32-11 of the corresponding height sensing elements 30-1 to 30-11 are shown directed vertically downwards from about the centre of each sensor 30 and viewed at an angle to the vertical as seen from FIGS. 1A and 1B.

Each sensor 30 views its respective beam 32 at an oblique angle $\alpha$ from the vertical and over a given height measurement range (shown as "h" in FIG. 1). The longitudinal spacing (shown as distance "a") of the height sensor elements 30 defines the longitudinal distance-sampling interval of the profiler. The sampling interval "a" for the profiler 14 is approximately 25 mm. Each Optocator sensor 31 has a digital output for measurement data which is stored in a computer (not shown) connected to the sensor in a conventional manner.

The height sensors 30-1 and 30-11, which are respectively at the trailing end 43 and the leading end 42 of the sensor array 16 serve a dual purpose, namely measuring the relative height of the road surface 24 below the sensor array and synchronizing adjacent profile measurements made with the sensor array, as described in more detail below.

In a typical application the inclination measuring transducer 18 can be an accelerometer whose sensitive axis is aligned with the direction of the measurements (which is also the direction of forward motion) and is horizontal when the device is on a flat level surface.

Figures 3, 4:
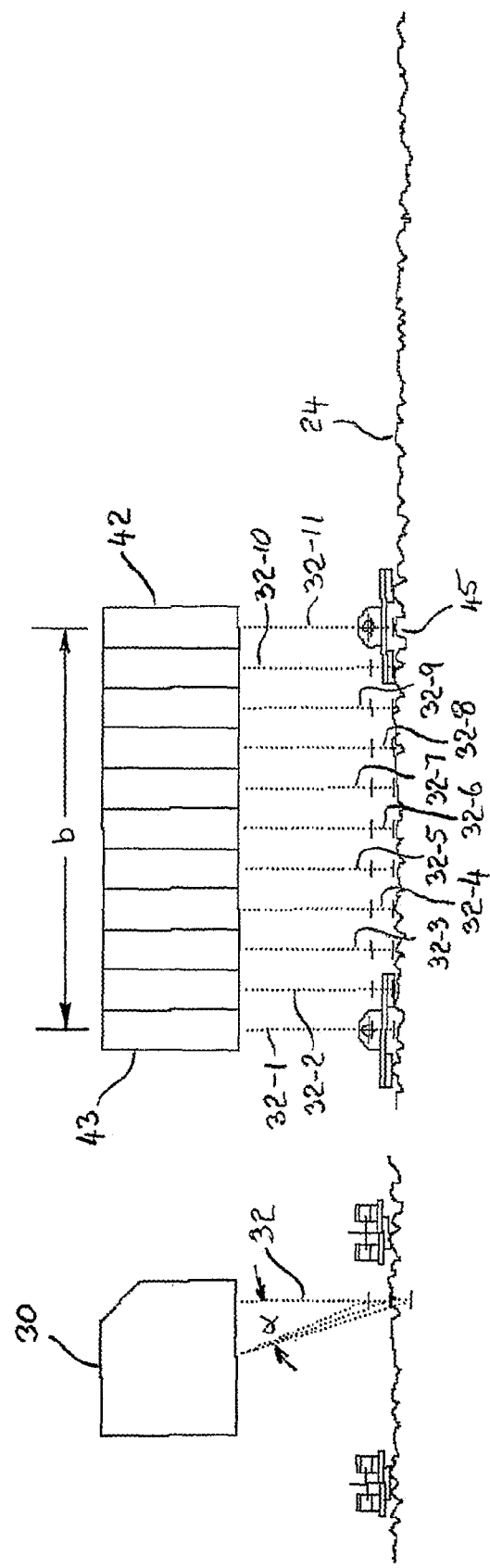
FIGS. 3 and 4 illustrate respectively an end view and a side view of the sensor array of the profiler in FIGS. 1 and 2 positioned for making a first set of profile measurements over the length of the sensor array.

To use the apparatus, the profiler 14, comprising the sensor array 16, inclinometer 18 and relatively pivoting frame ends 22 and 23, is placed on the pavement and a first set of measurements is taken. At this starting position, the height reading from each of the eleven height sensors 30-1 to 30-2 is recorded together with the angle-of-inclination of the sensor array from the horizontal as determined by the inclinometer 18. Combining the information from the height measurements together with the angle of inclination produces the first set of profile measurements over the length of the height sensor array, as indicated in FIGS. 3 and 4. All subsequent profile height readings once computed are referenced to the height reading so calculated for sensor 30-1.

When the first profile measurement is complete, the profiler is raised off the pavement 24 by a suitable lifting and transport mechanism, using the carry points 26 and 27, and moved forward precisely the sensor array measurement length (shown as distance "b" on FIG. 4), and lowered onto the pavement. The measuring beam 17 is allowed to come to rest and the sensor readings allowed to stabilize before a new set of measurements is taken.

In this new position the feet on the trailing end 23 of the frame are positioned at the same locations 45 previously occupied by the feet on the leading end 22.

Then height readings from the height sensors 30 are again recorded, together with the angle-of-inclination of the sensor array, to produce a second set of profile measurements over the sensor array measurement length. The rearmost profile readings from the current measurement are synchronized with the forward-most readings from the previous measurement to develop a continuous profile, as illustrated in FIG. 6.

Figure 7:
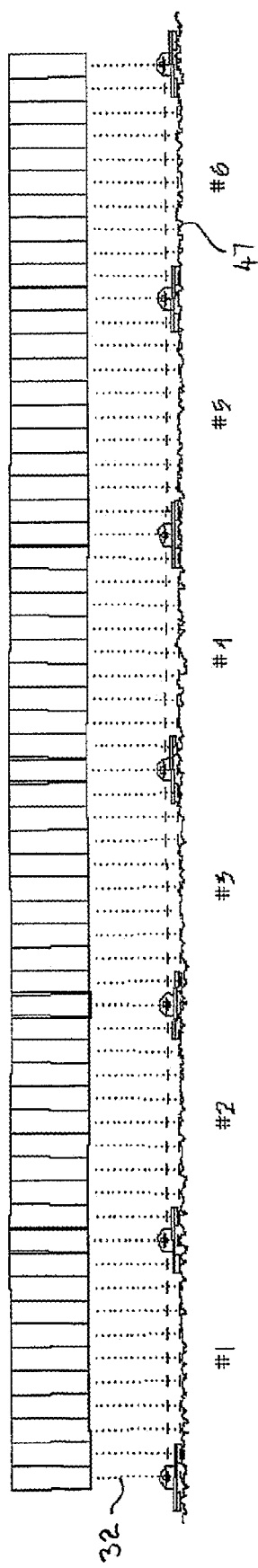
FIG. 7 is an illustration showing successive locations of the sensor array as the profiler is moved.

The above described procedure is repeated (shown as repeats #2, #3, #4, #5 and #6 in FIG. 7) until the entire length of the test section 47 has been stepped out and a full profile has been developed, as illustrated in FIG. 7. Once the entire profile has been recorded it can be treated as a single continuous profile.

The performance of the profiler described above has been compared with the WP. For this comparison two 1.5 m lengths of highly accurate profiles were obtained on two surfaces using the SLP. One profile was taken on a surface that has a very low texture level (mean profile depth of 1.16 mm) and the other a very coarse texture level (mean profile depth of 3.21 mm). Profile height readings with the SLP were taken at a distance sampling interval of about 0.25 mm with a height resolution of about 8 µm.

FIGS. 8 and 9 show the actual profiles as measured with the SLP at the 0.25 mm sampling interval, and at the relevant sampling intervals of the other profilers, namely 241.3 mm for the WP and 25 mm for the profiler shown in FIG. 1, respectively.

The distance-interval sampled profiles produced by the SLP and the profiler of the first embodiment of the present invention are more closely matched than are those of the SLP and WP, because the WP is seen to have missed much of the profile detail. This is more clearly evident on the very-low texture surface than on the surface with the coarse texture. These results reflect the influence of both sampling interval and texture on profile measurements, a problem referred to earlier in this specification.

The performance of the WP and the RP of the first embodiment were next simulated on the two profiles, namely very low texture level and a very coarse texture level. FIGS. 10 and 11 show the results for the WP, and FIGS. 12, 13, 14 and 15 show the results for the new profiler of the first embodiment. FIGS. 16 and 17 show the superiority of the new profiler (RP) when compared with the Walking Profiler (WP). From the plots it can be seen that the agreement between actual and simulated profiles is superior for the RP than for the WP. The new profiler with its much smaller sampling interval and direct contact with the profile has recorded much more detail and been more accurate than the WP. The RP would be expected to correlate much better with high-speed laser based profilers used for network level surveys which typically use lasers to sample profile height every 50 mm of travel.

In a second embodiment of the present invention an alternative arrangement is used when moving the measuring beam. When the first profile measurement is complete, the measuring beam is raised off the pavement by a suitable transport mechanism, moved forward a distance which is equal to the distance between the second last height sensors at each end, and lowered onto the pavement. Again the measuring beam is allowed to come to rest and the sensor readings allowed to stabilize before a new set of measurements is taken. In this new position the rear-most height sensor and its adjacent second-rear-most height sensor are positioned respectively at the position previously occupied by the second-front-most height sensor and the front-most height sensor.

A consequence of the increased overlap of height readings at the ends of the beam is that there is an increased accuracy in the linking of measurements between successive positions of the beam.

Additional height sensors may be provided at each end of the beam in order to provide the increased overlap. To still further improve accuracy, the height sensors at the ends of the beam may be spaced substantially closer than the sensors in the middle of the sensor array.

The profilers of the first and second embodiments offer the following advantages over previous profilers:
  The distance increment at which height measurements are taken is much shorter and can be reduced by an order of magnitude or more than current profilers, ie it can be made 25 mm or less.
  The new profiler's sensitivity to textured surfaces is the same as that of highway-speed laser-based profiling systems. Fewer differences between instruments means more meaningful verification of roughness measurements and better agreement between instruments.
  The new profiler measures roughness (0.5 m to 50 m wavelength range) as well as megatexture (50 mm to 500 mm wavelength range).
  Speed of operation is unlikely to be affected (typically about 800 meters/hr for a similar device such as the WP but with a much larger sampling interval, 240 mm compared with approximately 25 mm for the reference profiler).

The new profiler is expected to easily meet the requirements of ASTM E1364 Class 1, ASTM E950 Class 1, and World Bank Class 1 categories.

A third embodiment of the invention is illustrated in FIGS. 18 and 19. A substantially greater overlap of the height readings is provided. This involves the use of a measuring beam having twice the length and twice the number of height sensors compared with that described above with reference to FIGS. 1A to 1C. In use, this beam is moved forward, from its position shown in FIG. 18 to its position as shown in FIG. 19. This movement between successive measurements is for a distance which is only half the length of the sensor support frame.

An overlap region is thus measured. Using the matched profiles in the overlap region as the reference, the location and orientation in pitch of the sensor array can be determined very precisely. The new set of profile readings then provides the reference set of measurements for the next set of readings allowing a continuous and very accurate profile to be developed.

By correlating the measurements in the overlap region taken at the first position of the beam with the measurements in the overlap region taken at the second position of the beam, the correlations allow a profile measured at each position of the beam to be accurately linked to the profile measured at adjoining positions of the beam and for this to be done without needing to use an inclinometer.

In a fourth embodiment of the invention, the readings from a profiler's sensor array are made continuously (or near continuously) and thus provide a line of height measurements making the sampling interval very small. Instead of moving the sensor array forward in discrete steps, it is rolled along on a wheel set, at a medium to fast walking pace, or faster, thus offering a higher speed of operation than the first embodiment. This fourth embodiment takes a line of height readings more frequently or continuously, thereby building a profile as it moves along each distance increment by correlating the then current set of height readings with the previous set.

The sensor array of the fourth embodiment need not be supported by the pavement but instead may be supported over the pavement by a frame extending across the pavement or attached directly to a paving machine. This allows for use on wet concrete pavement during paving operations and before it sets.

In relation to the fourth embodiment, FIG. 20 illustrates the sensor array positioned at its starting position (called Position 1) at the start of a profiling run. The array has twelve height sensors mounted side by side so that their laser beams project vertically down to strike the surface being measured below at twelve respective equi-spaced points shown as points 1, 2, 3, 4, 5, etc on FIG. 20. The position of the array shown in FIG. 20 is termed Position 1. Height readings are commenced from this position, the first being a reference height reading.

In FIG. 21 the array has moved a short distance (termed the "Intermediate Distance") to the right of Position 1, with its new position shown in solid outline and Position 1 shown by dashed outline. The laser beams for both positions are shown as dotted lines. In FIG. 22 the array has moved a complete "step-distance" and is now at Position 2, at which the height sensor which was directed at point 1 in FIG. 20 is now directed at point 2. "Intermediate-distance" height readings are taken continuously between Positions 1 and 2, ie between successive step-distance increments. The intermediate-distance height readings are correlated (as described later in this specification) with the "reference height" readings to establish when the sensor array has traveled exactly the one step-distance increment from Position 1 to Position 2. When the sensor array has moved forward exactly the one step-distance increment (as determined by correlation), step-distance height readings are taken. When in this position the height of the first new profile point P1, at the leading end of the array, can be estimated (labelled as P1 in FIG. 22).

In FIG. 23 the array has moved a little over three step distances from Position 1. It is shown moving from Position 4 to 5. Having completed calculations associated with Positions 3 and 4, in the same manner as that described above, and continuing forward movement of the sensor array, intermediate-distance height readings are taken continuously in order to determine when the sensor array has traveled forward the next step-distance increment.

FIG. 24 shows the array at Position 6, having moved five step distances from Position 1. Step-distance height readings are recorded each time the sensor array has moved forward one step-distance increment. Using the reference height readings from Position 1, the new height data from the moving sensor array is used to estimate the height of the five profile points P1 to P5. The height of profile points P1 to P4 were also estimated in calculations associated with preceding step-distance height readings (Positions 1 to 4 of the moving sensor array), some being estimated more than once.

Referring to FIG. 25, the array is shown at Position 4. Step-distance height readings have been taken at each new step-distance increment, at Position 2, 3 and Position 4. As illustrated in FIG. 26, as the sensor array moves forward from Position 4, intermediate-distance height readings are taken, and, as before, correlation is used to determine when the sensor array has moved forward one step-distance increment (from Position 4 to 5).

In FIG. 27 the array is shown at Position 5. From this position, step-distance height readings are again taken and a further estimate of profile point P5 is determined. Several other estimates of P5 are available from the calculations associated with previous sensor array positions, such as is shown in FIG. 24 for reference height readings from Position 1.

Referring to FIG. 28, when the array is in Position 6, an estimate of the height of further profile point P6 is made together with a further repeat estimate of P5 (see FIG. 20).

FIG. 29 illustrates the paths of laser beams from the height sensor array under the following conditions:

(a) readings for the start position (thinner lines) of the height sensor array when the first set of reference height readings are taken and stored, and, (b) with the height sensor array in motion (thicker lines) when intermediate height readings are taken continuously as the array travels in the direction shown by the arrow.

As the height sensor array travels along the profile, the correlation between the intermediate height readings from sensor laser beams 1 to 11 (shown as thicker lines) and the stored reference readings from sensor laser beams 2 to 12 (shown as thinner lines) is determined for each set of intermediate height readings. Typically, laser-based height sensors allow high-precision height readings to be taken up to about 64,000 times a second. Using the method of this embodiment, an almost continuous readout of correlation may be obtained. The profile used in this example was taken on a coarse textured surface with the SLP.

FIG. 30 illustrates the degree of correlation between the reference and intermediate height readings described in relation to FIG. 29 for each traveled distance increment (approximately 0.25 mm for the SLP) over a total traveled distance of 30 mm from the start. The plot in FIG. 30 shows the correlation along the full 30 mm distance, while the thick vertical line at about the 14 mm position indicates the correlation between the reference and intermediate height readings (less than 0.05) for the positions shown in FIG. 27.

But when the height sensor array has traveled forward a distance exactly equal to the distance between adjacent height sensors (referred to earlier in this specification as the step-distance, and being 25 mm in this example), the intermediate height readings from sensors 1 to 11 (shown as thin lines in FIG. 29) coincide with the stored reference height readings from sensors 2 to 12 (thicker lines in FIG. 29)—as illustrated below in FIGS. 24 and 25—and a high correlation between readings is obtained.

As seen from FIGS. 31 and 32, when the height sensor array has traveled a distance exactly equal to the distance between adjacent height sensors (25 mm in this example), the intermediate height readings from sensors 1 to 11 coincide exactly with the reference height readings from sensors 2 to 12. When this occurs high correlation is achieved (correlation peaks at a magnitude of about 1.0), as seen at the thick vertical line in FIG. 32 at a "distance-from-start" location of 25 mm. When this occurs, using basic geometry a new profile point can be computed that is based on the overlap readings from the reference and intermediate set of height reading and the reading from the intermediate height sensor 12, as shown above for height sensor array readings that have a slight vertical offset. When the height readings are highly correlated they are taken at exactly the same points on the road profile, and so, the method described is equally applicable to correlated readings from reference and intermediate height sensor arrays that have both a vertical offset and angular misalignment in pitch.

When a high correlation between the reference and intermediate height readings shown in FIG. 32 has been achieved under the overlap conditions illustrated in FIG. 31, the intermediate set of twelve height sensor readings are stored as the new set of reference height readings and the process is repeated as shown in FIG. 33. In this way each traveled distance increment equal to the distance between adjacent height sensors (25 mm in the example) will lead to high correlation between the intermediate and reference height readings, as seen in FIG. 34. Each time such a high correlation peak occurs, a new profile point is determined and the length of the measured profile is extended by a distance increment that is exactly equal to the distance between adjacent height sensors. Unlike other profiling methods, this method does not require or rely on distance to be measured directly, usually with an instrumented wheel which is subject to error due to wheel slippage, subtle changes in rolling radius, and is a source of inaccuracy in profile measurements. Instead, distance is determined very precisely by using the correlation method now described. The vertical dotted line positioned at about the 31 mm mark in FIG. 34 corresponds to the position shown in FIG. 33 for the array and thus indicates the degree of correlation for the scenario shown in FIG. 33.

FIG. 34 illustrates the correlation between the intermediate and reference height readings taken on a coarse textured surface. High correlation peaks (having a magnitude of about 1.0) occur at distance intervals that are exactly integer multiples of the spacing between adjacent height sensors (25 mm in the example).

FIG. 35 illustrates the correlation between the intermediate and reference height readings taken on a smooth textured surface with the SLP. As for the example shown in FIG. 34, high correlation peaks (having a magnitude of about 1.0) occur at distance intervals that are integer multiples of the 25 mm spacing between adjacent height sensors. By increasing the number of height sensors in the array (by either making the array longer or spacing each sensor closer) the correlation "signal-to-noise" ratio can be improved.

The method of calculations associated with the above described fourth embodiment will now be explained with reference to FIGS. 36-42

FIG. 36 shows the sensor array one step-distance increment along the profile (at Position 2, in solid lines) from its initial reference Position 1 (dashed lines). As shown, the array has both a vertical offset and angular misalignment in pitch of 5° with respect to reference Position 1. An enlargement of Detail "A" is shown in FIG. 37 highlighting some inaccuracies which may occur when pitch angles are large. FIG. 30 illustrates how angular misalignment in pitch causes the step-distance increment height readings at some sensor locations to be slightly offset from the reference set of height readings. This generally occurs only for large pitch angles, such as shown in FIG. 36, and it can lead to a mismatch between the reference and step-distance height readings. To produce a large pitch angle in a sensor array that is about 300 mm long would require a change in height at one end of the array (up or down) of about 25 mm over a step-distance increment of 25 mm. In practice this would be an unlikely event.

Various methods can be used to improve the accuracy and robustness of profile estimates, and two such methods are described in more detail below.

While the measurement shown in FIG. 36 is sufficient to estimate profile point P1 from the reference and step-distance increment height measurements, a second estimate of profile point P1 may be obtained when the sensor array is located two step-distance increments from reference Position 1. This position is shown in FIG. 38 for a sensor array having a vertical offset and angular misalignment in pitch of only 2°. In this position the first estimate of profile point P2 is obtained, and a second estimate of profile point P1 (identified in FIG. 38 as P1') is also obtained. Making repeat measurements at each location in this manner improves accuracy and leads to more robust profile estimates.

FIG. 39 shows the array moved forward a further step-distance increment to Position 4. In a similar manner to that described above, profile point P3 is then estimated. In this position a second estimate of profile point P2 is obtained, and a third estimate of profile point P1 is also obtained.

Using the reference height readings from Position 1 and further step-distance increment height readings from the sensor array, this process can be continued and a multitude of estimates for profile point P1, P2, P3, etc, can be obtained. This process is repeated up to the point where the overlap region is insufficient to produce reliable estimates of the angular orientation of the sensor array from the step-distance increment readings relative to the reference height readings. Once calculated, various methods and weightings can be used to combine the profile point estimates at each point (P1, P1', P1'', etc), thereby producing a single, robust profile estimate. By applying this technique to the reference height readings at positions 1, 2, 3 etc., and their associated step-distance height readings as described above, a multitude of profile estimates can be obtained at each location in the measured profile. In this way reference and step-distance height readings corresponding to reference Position 1 produce a multitude of profile points, reference and step-increment height readings corresponding to reference position 2 produce a further multitude of profile points, reference and step-increment height readings corresponding to reference position 3 produce a further multitude of profile points, and so on.

Referring to FIG. 40, this shows the actual reference height readings corresponding to Position 1 (labelled 1) and successive step-distance height readings (labelled 2, 3, and 4) from the scenarios shown in FIGS. 36, 38 and 39, respectively. These are shown together with the differences between the reference and step-distance height sensor readings (labelled 1-2, 1-3 and 1-4). In order to estimate profile points P1, P2 and P3, the vertical offset and angular misalignment in pitch between the sensor array at each step-distance increment (2, 3 and 4) and reference Position 1 must be determined. Using a least squares regression technique, or similar, as shown in FIG. 41, the vertical offset and angular position of the sensor array at each step-distance increment can be determined. Using this technique, inaccuracies such as described with reference to FIG. 37 are minimised.

Each equation represented in FIG. 41 is a line-of-best-fit that is based on height difference readings and linear regression analysis. These are best estimates of the vertical offset and angular misalignment between height readings taken at the reference and step-distance sensor locations. Under ideal conditions, when there is no angular misalignment in the reference and step-increment readings, all points on each of the difference lines shown above would fall on the line-of-best-fit. However, referring to height difference points 1-2, and its corresponding line-of-best-fit, it can be seen that some of the points are slightly offset from the line (175 and 200 mm distance points). This is due to the angular misalignment discussed with reference to FIG. 37. Large angular misalignment as shown in FIG. 36 leads to errors of this type.

FIG. 42 summarises the main features of the process for initial calculations corresponding to reference height readings at Position 1 and the first three step-distance height readings. In FIG. 42, profile points P1", P2' and P3 have been estimated from height measurements taken at step-distance increment corresponding to locations 2, 3 and 4 and regression equations 1-2, 1-3 and 1-4, in the manner described above. Profile point P1" comprises three independent profile point estimates, P2' comprises two independent profile point estimates, and P1 is a single estimate. Subsequent forward movements of the sensor array produce a multitude of profile point estimates from which robust profile estimates can be obtained.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

For example, as a further embodiment of the invention, the sensors need not be eqi-spaced in the array. In some circumstances an outlier sensor may be used to increase the sensor array measurement length, or groups of sensors may be arranged in two or more different longitudinal spacings. This could offer advantages of cost effectiveness. The variations required to be made to the above described calculations for utilising the readings from such combinations of non-equidistantly spaced sensors are within the skill of a person skilled in the art.

Also, as a further embodiment of the invention, the profiler could have two linear arrays of sensors each of said arrays being parallel to each other. Such a profiler would generate two parallel sequences of profiles simultaneously. Alternatively the profiler could have an array of sensors spread out over a plane which, when it is moved linearly in the manner described for a single linear array in relation to the fourth embodiment, a 3-dimensional surface can be measured.

The invention may be used for measuring the unevenness of pavement after prolonged use to assess degradation of the pavement surface. It may also be used for monitoring the surface condition of new pavement as it is being laid and arrays according to the invention may be attached to, for example, concrete laying machines for this purpose. The invention may also be used for verification of surface quality of recently laid pavements to determine whether specified performance requirements have been met by a construction contractor.

The multitude of intermediate readings between the step distance readings may be used to calculate a measure of the macrotexture and microtexture profiles between the step distance readings.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge in Australia.

The invention claimed is:

1. A method for measuring the unevenness of a pavement surface comprising:
   (i) transporting in a given direction above the pavement surface a sensor support frame carrying an array of sensors, said array having a plurality of sensors spaced by set distances and aligned in said given direction;
   (ii) at a first position of said frame, measuring with each of said sensors and recording a parameter indicative of the distance of each said sensor from respective first points in a first array of points on the pavement surface;
   (iii) while moving the sensor support frame in said given direction from the first position, measuring at a plurality of positions of said frame the parameter indicative of the distance of each said sensor from respective subsequent points on the pavement surface;
   (iv) determining a second position of the frame when a plurality of the sensors in said array are measuring the parameter from respective second points in a second array of points, said second array of points being displaced from said first array of points by a distance equal to a said set distance between adjacent said first points and in the direction of transportation, and recording for the sensors the parameter measurements at said second position of the frame;
   (v) calculating from said measurements at the second position, any change in tilt of the frame between the first and second positions;
   (vi) repeating steps (iii) to (v) allowing for said change in tilt when linking measurements to produce a continuous profile over multiple said positions of the frame;
   (vii) repeating the transportation, measurement and calculation steps progressively along the pavement surface to generate a sequence of profiles each with a known relative position and alignment; and
   (viii) generating from said sequence of profiles known relative positions and alignments, an indication of the unevenness of the surface.

2. A method for measuring the unevenness of a pavement surface comprising:
   (i) transporting in a given direction above the pavement surface a sensor support frame carrying an array of sensors, said array having a plurality of sensors spaced by set distances and aligned in said given direction;

(ii) at a first position of said frame, measuring with each of said sensors and recording a parameter indicative of the distance of each said sensor from respective first points in a first array of points on the pavement surface;

(iii) while moving the sensor support frame in said given direction from said first position, measuring at a plurality of positions of said frame the parameter indicative of the distance of each said sensor from respective subsequent points on the pavement surface;

(iv) determining a second position of the frame when a plurality of the sensors in said array are measuring the parameter from respective second points in a second array of points, said second array of points being displaced from said first array of points by a distance equal to a said set distance between adjacent said first points and in the direction of transportation, and recording for the sensors the parameter measurements at said second position of the frame;

(v) calculating from said measurements at the second position, an estimate of the position of a leading point in said second array of points;

(vi) while moving the frame from said second position to a third position, repeating steps (iii) to (v) for respective further points on the surface;

(vii) calculating from said measurements at the third position an improved estimate of the position of said leading point at said second position of the frame;

(viii) linking measurements to produce a continuous profile over multiple said positions of the frame;

(ix) repeating the transportation, measurement and calculation steps progressively along the pavement surface to generate an indication of the unevenness of the surface.

3. A method according to claim 1 wherein said plurality of sensors are equi-spaced.

4. A method of measuring the unevenness of a pavement surface comprising:

(i) resting onto the pavement surface at a first position a sensor support frame carrying an array of sensors;

(ii) measuring at the first position with each one of the sensors, a parameter indicative of the distance of said each one sensor from a respective first point on the pavement surface;

(iii) transporting the sensor support frame to rest it on the pavement at a second position spaced a known distance and direction from the first position;

(iv) measuring at the second position with each one of the sensors, a parameter indicative of the distance of said each one sensor from a respective second point on the pavement surface;

(v) calculating from said measurements at the first position a profile of the surface at the first position;

(vi) calculating from said measurements at the second position, and said known distance and direction, a profile of the surface at the second position and the relative position and alignment of said profiles;

(vii) repeating the transportation, measurement and calculation steps progressively along the pavement surface to generate a sequence of profiles each with a known relative position and alignment; and (viii) generating, from said sequence of profiles known relative positions and alignments, an indication of the unevenness of the surface.

5. A method according to claim 4 including measuring the inclination of said array of sensors at said first and second positions and using said inclination measurements in said calculation of the profile of the surface.

6. A method according to claim 4 wherein said first and second positions are located such that said profile for the first position overlaps said profile for the second position, and said relative position and a matching of said overlapped portions are used in the determination of the inclination of the surface.

7. A method according to claim 2 wherein said plurality of sensors are equi-spaced.

8. A method according to claim 5 wherein said first and second positions are located such that said profile for the first position overlaps said profile for the second position, and said relative position and a matching of said overlapped portions are used in the determination of the inclination of the surface.

* * * * *